(12) United States Patent
Tanada et al.

(10) Patent No.: US 6,219,388 B1
(45) Date of Patent: Apr. 17, 2001

(54) DIGITAL DATA DEMODULATING DEVICE FOR ESTIMATING CHANNEL IMPULSE RESPONSE

(75) Inventors: Kazuo Tanada; Hiroshi Kubo; Keishi Murakami, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/007,533

(22) Filed: Jan. 15, 1998

(30) Foreign Application Priority Data

Jul. 23, 1997 (JP) .................................................. 9-196689

(51) Int. Cl.[7] ...................................................... H03D 1/00
(52) U.S. Cl. ........................... 375/341; 375/262; 714/795
(58) Field of Search .................................... 375/229, 262, 375/265, 341, 346, 343; 714/791, 794, 795, 796

(56) References Cited

U.S. PATENT DOCUMENTS

| | | | |
|---|---|---|---|
| 4,797,887 | * 1/1989 | Yamasaki et al. | 714/791 |
| 5,081,651 | * 1/1992 | Kubo | 375/341 |
| 5,117,427 | 5/1992 | Miyake et al. . | |
| 5,224,127 | * 6/1993 | Okanoue | 375/343 |
| 5,272,726 | 12/1993 | Furuya et al. . | |
| 5,450,445 | 9/1995 | Ushirokawa . | |
| 5,465,276 | * 11/1995 | Larsson et al. | 375/346 |
| 5,550,870 | * 8/1996 | Blaker et al. | 375/341 |
| 5,581,581 | 12/1996 | Sato . | |
| 5,602,507 | 2/1997 | Suzuki . | |
| 5,710,792 | * 1/1998 | Fukawa et al. | 375/229 |
| 5,844,946 | * 12/1998 | Nagayasu | 375/341 |

OTHER PUBLICATIONS

Alexandra Duel–Hallen et al., "Delayed Decision–Feedback Sequence Estimation," IEEE Transactions on Communications, vol. 37, No. 5, May 1989, pp. 428–435.
Kurt Metzger, "A New Concept for Simplified Viterbi Detection," Singapore ICCS/ISITA '92, IEEE, pp. 1307–131.
G. David Forney, Jr.; "The Viterbi Algorithm"; Proceedings of the IEEE; 1978; vol. 61, No. 3, pp. 268–278.

* cited by examiner

Primary Examiner—Stephen Chin
Assistant Examiner—Chieh M. Fan

(57) ABSTRACT

A digital data demodulating device that estimates the channel impulse response (CIR) based on a received signal, and performs a viterbi algorithm using the replica generated according to the estimated CIR, and the received signal. The digital data demodulating device of the present invention follows the time variation of the channel by sequentially estimating the CIR in the CIR estimating circuit. The replica generating circuit of the digital data demodulating device includes a device for storing the estimated CIR and replica for each block therein, for reading the estimated CIR at a specific timing and updating the replica. A digital data demodulating device which reduce circuit scale, operates in a high speed, and appropriately follows the time variation of the channel, even in a high bit transmission rate and in a high delay dispersion of the multipass wave contained in the received signal.

12 Claims, 11 Drawing Sheets

DIGITAL DATA DEMODULATING DEVICE FOR ESTIMATING CHANNEL IMPULSE RESPONSE

BACKGROUND OF THE INVENTION

1. Field of the Invention

The invention relates to a receiving device used for transmitting digital data in satellite communications, mobile communications, and mobile satellite communications. More particularly, the invention relates to a digital data demodulating device using a viterbi algorithm for determining the transmission data.

2. Description of the Related Art

It is well known that, in a receiving device, a viterbi algorithm is very effective when a channel includes an ISI (Inter-symbol Interference) as a device for deciding the data from a transmitted received signal which has been digitally modulated using methods such as PSK (Phase Shift Keying). A conventional digital data demodulating device is discussed below using an example disclosed in "The Viterbi Algorithm" written by G. D. Forney, Jr. (Proc. IEEE, Vol. 61, No. 3, pp. 268–278, March 1973).

FIG. 18 illustrates a model of a channel having ISI. Transmission data S61, which has been modulated in BPSK (Binary Phase Shift Keying), are sequentially input to the shift register 61, which contains (V−1) stages, where, (V−1) is the number of multi-path wave maximum delay symbols that are contained in the received signal. The transmission data S61 and the output from the shift register 61 are multiplied by tap coefficients (CIR) $C_1, \ldots, C_V$, respectively, where CIR represents the channel impulse response. The resulting products are added in an adder 63. The output from the adder 63 is added to the noise $w_n$ in an adder 64, and the adder 64 outputs a received signal S62. The received signal S62 is expressed by the following formula (1), where received signal S62 is denoted as $I_n$, the transmission signal S61 as $I_n$, and the respective outputs from the shift register 61 as $I_{n-1}, I_{n-2}, \ldots, I_{n-(V-1)}$.

$$r_n = \sum_{v=1}^{V} C_v I_{n-(v-1)} + w_n \qquad (1)$$

In the channel model having the ISI illustrated in FIG. 18, the reception data is determined based not only on current transmission data, but also on past transmission data. Therefore, it is necessary to take the past transmission data into account in deciding the current transmission data.

The past transmission data is stored in the shift register 61. If the shift register length is (V−1) as illustrated in FIG. 18, the past transmission data of (V−1) symbol period is stored in the shift register 61. The past transmission data is stored in pairs in the shift register, and these pairs are defined as "states". If the shift register length is 2 (V=3), the following four states are included: state [0, 0], state [0, 1], state [1, 0] and state [1, 1]. In order to simplify the explanation, it is assumed here that the transmission data contain only two numbers, 0 and 1. In this case, the number of the states, $N_s$, are expressed by the formula $N_s = 2^{V-1}$.

A trellis diagram illustrates state variation which occurs as time passes. FIG. 19 is a trellis diagram illustrating the state variation when the shift register length is 2(V=3)s. In this case, the state [0, 0] is denoted as state A, the state [0, 1] as state B, the state [1, 0] as state C and the state [1, 1] as state D. In FIG. 19, the states A, B, C and D are illustrated in the vertical direction from the top to the bottom, and the time n−1, n, n+1, n+2, n+3 and n+4 are illustrated in the horizontal direction from the left to the right. A line is drawn from each state (each state is represented as a circle) to two other states at the subsequent time. These lines represent the transition of the states according to time. For instance, two lines are drawn from the state A to the state A and the state C of the subsequent time. The line drawn from the state A to the state A of the subsequent time illustrates a state transition when the input data (current transmission data) is 0. The line drawn from the state A to the state C of the subsequent time illustrates a state transition when the input data is 1.

These lines in the trellis diagram are called "branches". Here, a state at time n is represented as $S_n$, and the branches extending from the time n−1 to the time n are represented as $S_{n-1}/S_n$. As time proceeds, the states change via branches. The track of a state is defined as a path. In FIG. 19, examples of paths are illustrated with bold lines. A path starting at time n−1 and ending at time n+4 is represented as $S_{n-1}/S_n/\ldots/S_{n+4}$. Paths determine how states change, at the same time, determine the transmission data sequence $I_n, I_{n+2}, \ldots, I_{n+4}$. Therefore, it is possible to determine the transmission data sequence by determining the path at the receiver's end.

A viterbi algorithm determines a sequence of transmission data using the trellis diagram. FIG. 20 illustrates a conventional digital data demodulating device using a viterbi algorithm. In FIG. 20, a CIR estimating circuit 500 and a viterbi processor 100 receive a signal S1. The CIR estimating circuit estimates CIR based on the input signal S1, and outputs the estimated CIR S2. A replica calculating circuit 200 receives the estimated CIR S2 and calculates a replica S3 of the received signal S1. The viterbi processor 100 receives the signal S1 and the replica S3, determines the transmission data based on the received signal S1 and replica S3 according to the viterbi algorithm, and outputs the decision data S4.

The replica calculating circuit 200 calculates the replica S3 of a received signal S1 using the CIR S2, which has been estimated in the CIR estimating circuit 500. $C_1, C_2, \ldots, C_V$, which represent CIRs for the respective taps $V_1, V_2, \ldots, V_V$, are represented as $B_1, B_2, \ldots, B_V$, which are the estimated CIR S2 output from the CIR estimating circuit 500. As the trellis diagram illustrates, the branch $S_{n-1}/S_n$, which starts at time n−1 and ends at time n, is determined by pairs of the transmission data S61 and the past transmission data which are stored in the shift register 61. That is, assuming that candidate for the transmission data S61 is $J_n$, and candidates for the past transmission data are $J_{n-1}, J_{n-2}, \ldots, J_{n-(v-1)}$, vector $(J_n, J_{n-1}, \ldots, J_{n-(v-1)})$ takes $2^V$ values from $(0, 0, \ldots, 0)$ to $(1, 1, \ldots, 1)$. Accordingly, the branches $S_{n-1}/S_n$ have $2^V$ ways, which start at time n−1 and end at time n. Accordingly, the replica S3 has $2^V$ values, corresponding to the respective branches illustrated in the trellis diagram. A replica $R_n(k)$ corresponding to the k-th branch (k=1, 2, ..., $2^V$) are obtained from the following formula (2).

$$R_n(k) = \sum_{v=1}^{V} B_v J_{n-(v-1)} \ (k = 1, 2, \ldots, 2^v) \qquad (2)$$

In formula (2), the vector $(J_n, J_{n-1}, \ldots, J_{n'(V-1)})$ takes different $2^V$ values from $(0, 0, \ldots, 0)$ to $(1, 1, \ldots, 1)$ corresponding to k.

An example of the viterbi processor 100 is illustrated in FIG. 21. In FIG. 21, the same portions as those shown in FIG. 20 are represented with the same numbers, and repeated explanations of them are omitted. A branch metric generating circuit 110 obtains a respective branch metric corresponding to the respective branches, which are illustrated in the trellis diagram. An ACS processing circuit 120 performs ACS processes (ACS: Add, Compare and Select) based on the branch metric output from the branch metric generating circuit 110. A path metric memory 130 stores the total sum of the branch metric contained in the candidate paths in the past transmission data sequence. A path memory 140 stores the candidate paths in the past transmission data sequence. A decision circuit 150 decides the transmission data based on the output from the path memory 140, and outputs the decision data S4.

The branch metric generating circuit 110 obtains and outputs $2^V$ different values of branch metric En (k), which correspond to the respective branches, from the $2^V$ replicas S3 illustrated in the trellis diagram. The branch metric En (k) are expressed in a following formula (3), where the received signal S1 is $r_n$, and the $2^V$ replicas S3 are $R_n(k)$.

$$E_n(k)=|r_n-R_n(k)|^2 \ (k=1, 2, \ldots, 2^v) \quad (3)$$

The ACS processing circuit 120 selects a path to the respective states (represented with white circles) at the respective time. If the number of states is $N_S$, the ACS processing circuit 120 selects Ns paths corresponding to the respective states. These selected $N_S$ paths are called "surviving paths", and they are stored in the path memory 140. The path memory 140 also stores the candidates of the past transmission data sequence up to time U, which corresponds to the surviving paths. This "U" is defined as path memory length. The total sum of the branch metric included in the surviving paths is called surviving path metric, and is stored in the path metric memory 130. The ACS processing circuit 120 performs the processes on the respective states. Processes corresponding to a state "m" (m=1, 2, . . . , $N_S$) are explained.

Branch metrics $E_n(p)$ and $E_n(q)$, which correspond to the two branches connected to the state "m", are input to the ACS processing circuit 120 from the branch metric generating circuit 110. Two surviving path metrics $PM_{n-1}(i)$ and $PM_{n-1}(j)$ corresponding to two states "i" and "j", which are the states connected by the two branches connected to the state "m" and the one period prior state "m", are also input to the ACS processing circuit 120 from the path metric memory 130. Also, two surviving paths $PT_{n-1}(i)$, $PT_{n-1}(j)$ corresponding to two states "i" and "j", which are the states connected by the two branches connected to the state "m" and the one period prior state "m", are input to the ACS processing circuit 120 from the path memory 140. The branch metrics $E_n(p)$ and $E_n(q)$ are added to the path metrics $PM_{n-1}(i)$ and $PM_{n-1}(j)$, respectively, then the two sums are compared. The smaller sum is selected as a current surviving path metric $PM_n(m)$ corresponding to the state "m". In other words, the current surviving path metric $PM_n(m)$ are expressed by the following formula (4).

$$PM_n(m)=\min\{E_n(p)+PM_{n-1}(i), E_n(q)+PM_{n-1}(j)\} \quad (4)$$

The updated surviving path metric $PM_n(m)$ is stored in the path metric memory 130. If $E_n(p)+PM_{n-1}(i)$ are smaller in the comparison between $E_n(p)+PM_{n-1}(i)$ and $E_n(q)+PM_{n-1}(j)$ explained above, $PT_{n-1}(i)$ are selected. If $E_n(q)+PM_{n-1}(j)$ are smaller, $PT_{n-1}(j)$ are selected The oldest transmission data candidate is removed from this selected surviving path which is the one period prior state "m", and current transmission data candidate which is determined in the path selected based on the comparison result is added to produce the current surviving path $PT_n(m)$, which corresponds to the state "m". The updated current surviving path $PT_n(m)$ is stored in the path memory 140.

The decision circuit 150 decides only the oldest transmission data candidate in the surviving path corresponding to a fixed state, as decision data, of all the surviving paths corresponding to the respective states stored in the path memory 140, and outputs the transmission data candidate as decision data S4.

As explained above, the conventional digital data demodulating device decides the sequence of transmission data from the replica of the received signal, which is calculated using the CIR estimated in the CIR estimating circuit, and received signal based on the trellis diagram.

However, in a conventional digital data demodulating device, as a bit rate of transmission increases, the delay dispersion of the multi-path wave contained in the received signal also increases. As a result, the circuit scale of the digital data demodulating device becomes large, and more operations are necessary. Particularly, the circuit scale of the replica calculating portion increases exponentially in relation to the delay dispersion of the multi-path wave.

SUMMARY OF THE INVENTION

It is an object of the present invention to solve these problems, for example, to maintain the circuit scale small even when the delay dispersion of the multi-path wave contained in the received signal increases, and to provide a practical digital data demodulating device.

It is another object of the present invention to facilitate high-speed operations even when more operations become necessary, and to provide a practical digital data demodulating device.

It is further object of the present invention to provide a digital data demodulating device for following the time variation of the channels efficiently, with a reduced bit error rate.

According to an aspect of the invention, a digital data demodulating device for estimating channel impulse response (CIR) based on the received signal, deciding transmission data by performing a viterbi algorithm using a replica generated in response to the estimated CIR and the received signal, and outputting the decision data comprises CIR register means for storing the estimated CIR, replica calculating means for reading out the estimated CIR stored in the CIR register means, and calculating the replica using the estimated CIR, and replica table means for storing the replica output from the replica calculating means.

Preferably, the digital data demodulating device further comprises counter means for sequentially counting and outputting counter data comprising vectors of the bit number corresponding to number of the states, wherein the replica calculating mean reads out the estimated CIR stored in the CIR register means, and calculates the replica using the estimated CIR and the counter data output from the counter means.

Preferably, the digital data demodulating device further comprises selector means for selecting the replica stored in the replica table means in response to the surviving path corresponding to the states, when the viterbi algorithm is performed by generating the replica using the surviving path connected to the preceding state, and for outputting the replica according to the trellis diagram.

Preferably, the digital data demodulating device further comprises delay means for delaying received signal by a period from the input of the received signal to the output of the decision data; and CIR estimating means for estimating CIR sequentially based on the received signal output from the delay means and the decision data, wherein the replica of the replica table means is updated by reading the estimated CIR output from the CIR estimating means at a predetermined timing.

Preferably, the CIR estimating means estimates the CIR sequentially based on the receptions signal output from the delay means, the decision data, and the replica stored in the replica table means.

According to a further aspect of the invention, a digital data demodulating device for estimating channel impulse response (CIR) based on the received signal, deciding transmission data by performing a viterbi algorithm using a replica generated in response to the estimated CIR and the received signal, and outputting the decision data, comprises a plurality of divided CIR register means for dividing the estimated CIR into predetermined number of blocks and storing the divided estimated CIR; a plurality of divided replica calculating means for reading out the divided estimated CIR stored in the plurality of divided CIR register means, and calculating divided replicas using corresponding estimated CIR; and a plurality of replica table means provided corresponding to the plurality of the divided replica calculating means, for storing the divided replicas output from the plurality of the divided replica calculating means.

Preferably, the digital data demodulating device further comprises a counter for sequentially counting the counter data comprising a bit number corresponding to the divided block number and the state number, wherein the plurality of the divided replica calculating means reads out the divided estimated CIR which are stored in the corresponding plurality of divided CIR register means, and for calculating the divided replicas using the corresponding divided estimating CIR and the counter data output from the counter means.

Preferably, the digital data demodulating device further comprises a plurality of divided selector means provided corresponding to the plurality of the replica table means, for selecting a divided replica stored in the divided replica tables in response to the surviving path corresponding to the states, when the viterbi algorithm is performed by generating the replica using the surviving path connected to the preceding state, and for outputting the replica according to the trellis diagram.

Preferably, the digital data demodulating device of the invention further comprises delay means for delaying received signal by a period from the input of the received signal to the output of the decision data; and CIR estimating means for estimating CIR sequentially based on the received signal output from the delay means and the decision data, wherein the divided replicas in the divided replica table means are updated by reading the estimated CIR output from the CIR estimating means at a predetermined timing.

Preferably, the CIR estimating means estimates the CIR sequentially based on the received signal output from the delaying means, the decision data and the divided replicas stored in the divided replica table means.

According to a still further aspect of the invention, a digital data demodulating device for estimating channel impulse response (CIR) based on the received signal, deciding transmission data by performing a viterbi algorithm using a replica generated in response to the estimated CIR and the received signal, and outputting the decision data, wherein the surviving path metric corresponding to the respective state are converted according to a predetermined rule, and the transmission data is decided using the surviving path corresponding to the state (the quasi minimum likelihood state) in which the corresponding converted path metric becomes the smallest.

According to a further aspect of the invention, a digital data demodulating device for estimating channel impulse response (CIR) based on the received signal, deciding transmission data by performing a viterbi algorithm using replica generated in response to the estimated CIR and the received signal, and outputting the decision data, wherein absolute value calculation is used instead of square calculation upon calculating the branch metric.

Further scope of applicability of the present invention will become apparent from the detailed description given hereinafter. However, it should be understood that the detailed description and specific examples, while indicating preferred embodiments of the invention, are give by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DERAILED DESCRIPTION OF THE PREFERRED EMBODIMENTS

Embodiment 1.

Figure 1:
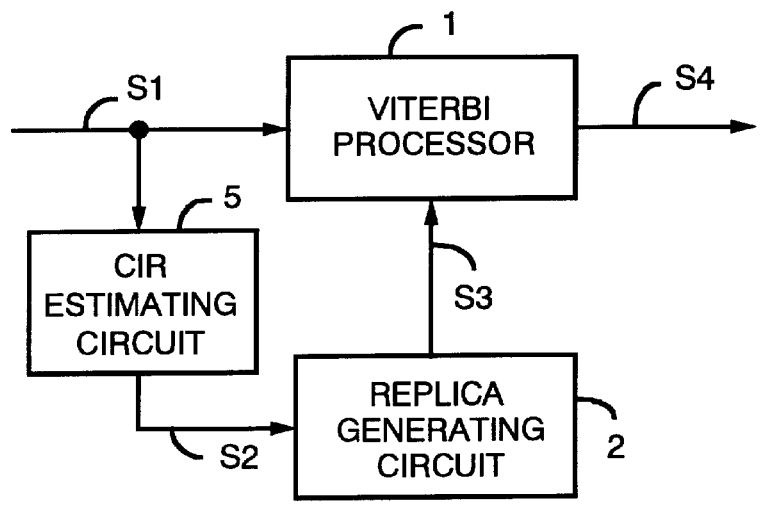
FIG. 1 illustrates a digital data demodulating device according to the first embodiment of the present invention.

A fist embodiment of the present invention is explained in connection with FIG. 1, which illustrates an example of a digital data demodulating device. In FIG. 1, same or equivalent portions as in the figures explaining the conventional example are assigned with the same numbers.

In FIG. 1, a CIR estimating circuit 5 receives an input signal S1 which has been modulated by for example BPSK, estimates a CIR, and outputs the estimated CIR S2. A replica generating circuit 2 generates a replica S3 of the received signal based on the estimated CIR S2, and outputs the replica S3. A viterbi processor 1 decides the transmission data based on the received signal S1 and the replica S3 using the viterbi algorithm, and outputs decision data S4.

Figure 2:
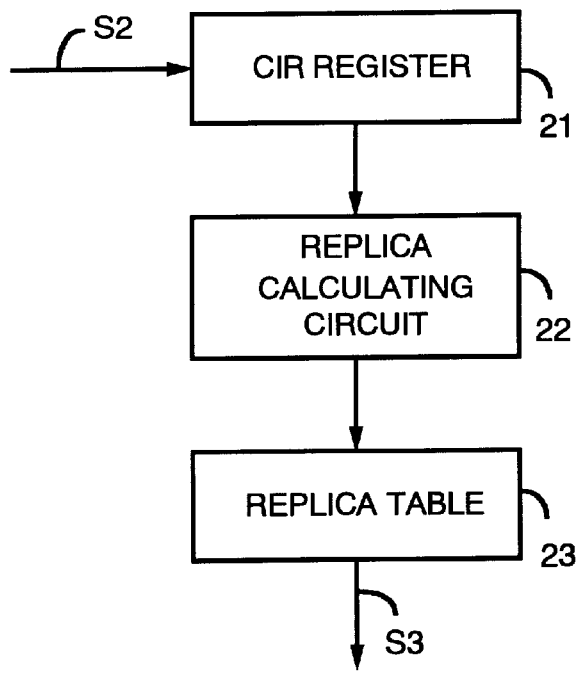
FIG. 2 illustrates a replica generating circuit located in the digital data demodulating device according to the first embodiment of the present invention.

FIG. 2 shows an example of the replica generating circuit 2. In FIG. 2, same or equivalent portions in FIG. 1 are assigned with same numbers, and repeated explanations of them are omitted. A CIR register 21 stores the estimated CIR S2. A replica calculating circuit 22 calculates replicas corresponding to each branch, shown in the trellis diagram, based on the estimated CIR stored in CIR register 21. A replica table 23 stores and outputs the replicas calculated in the replica calculating circuit 22.

The operation of the digital data demodulating device according to the first embodiment is explained using FIG. 1 and FIG. 2. The CIR estimating circuit 5 receives the received signal S1 and estimates CIR, and the CIR register 21 in the replica generating circuit 2 stores the estimated CIR S2. The replica calculating circuit 22 receives the estimated CIR S2 which has been stored in the CIR register 21, and calculates replicas S3, which correspond to each branch illustrated in the trellis diagram, using formula (2). The replica table 23 stores the replicas S3 corresponding to each branch, which has been calculated in the manner explained above, and replicas $R_n(k)$ are output from the replica table 23 to the viterbi processor 1.

Figure 20:
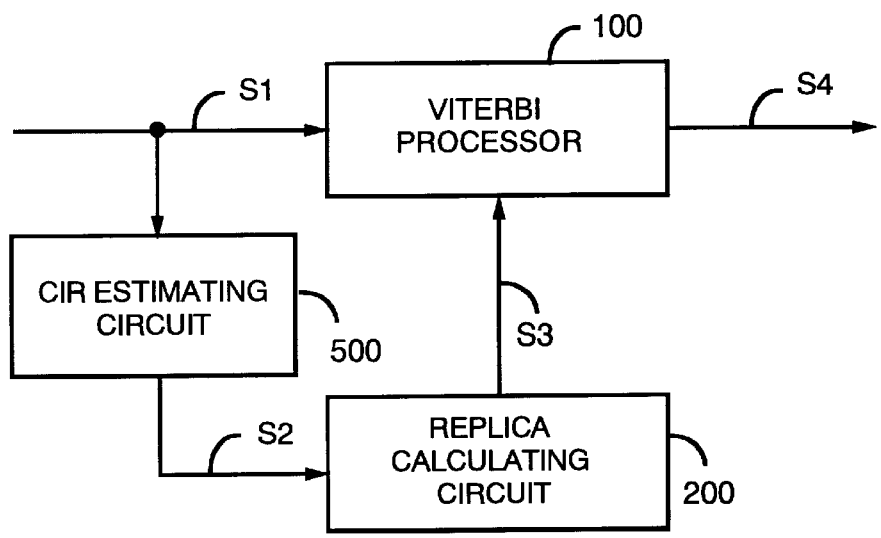
FIG. 20 illustrates a conventional digital data demodulating device.

The viterbi processor 1 receives the received signal S1 and the replicas S3, which are output from the replica generating circuit 2, and operates in the same manner as the conventional viterbi processor 100 shown in FIG. 20. After the transmission data has been decided, the viterbi processor 1 outputs the decision data S4.

Figure 3:
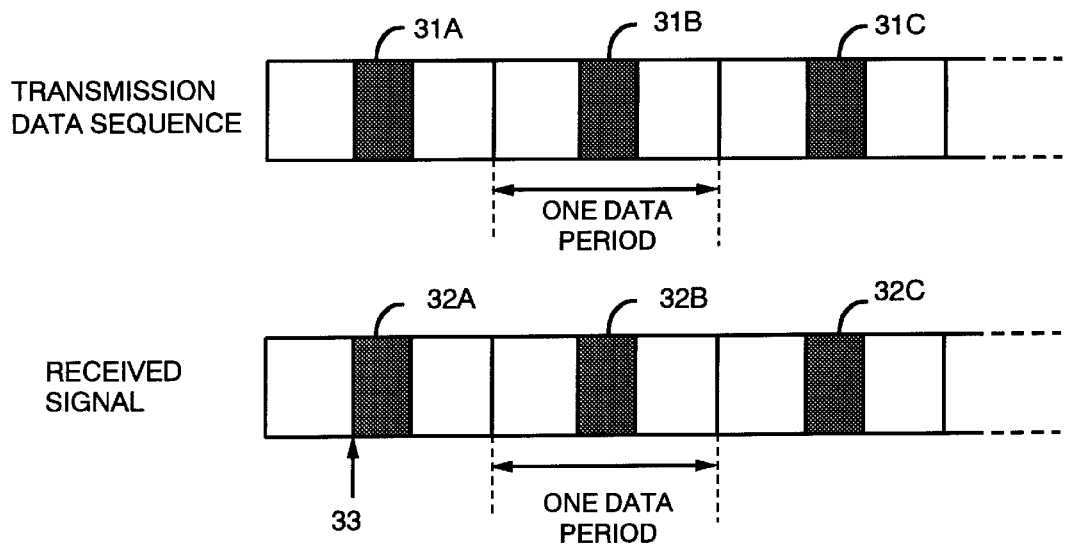
FIG. 3 illustrates an update timing of the replica table located inside the digital data demodulating device according to the first embodiment of the present invention.

The estimated CIR S2 is estimated in the CIR estimating circuit 5, and input to the replica generating circuit 2. An example of timing for updating the contents of the replica table 23 in the replica generating circuit 2, based on the estimation method, estimation timing and the estimated CIR. Upon estimating an CIR, for example, known data sequence 31A, 31B, 31C, . . . , are inserted in advance into the transmission data sequence for a particular interval as shown in FIG. 3. The CIR estimating circuit 5 prepares this known data sequence, and calculates each correlation value between the received signals and this known data sequence.

The CIR estimating circuit 5 extracts the correlation values of length V at a predetermined timing delayed from the timing (for example, at a time point shown by the number 33 in FIG. 3) when the received signals 32A, 32B, 32C, . . . begin to be received. The received signals 32A, 32B, 32C, . . . correspond to the period in which the known data sequence is inserted. The predetermined timing delays from the above reception timing are required to calculate the correlation. By using a suitable known data sequence, a correlation value sequence of the length V mentioned above results in estimated CIR $B_1, B_2, \ldots, B_V$ for V taps. After obtaining the estimated CIR for the V taps, the replica generating circuit 2 starts updating the contents of the replica table 23, located inside the replica generating circuit 2. The estimation of the CIR and update of the contents of replica table 23 are performed in every period in which the known data sequence are inserted. Using the contents of the updated replica table 23, the received signals are processed (decide of the transmission data) for each corresponding one data period.

In the digital data demodulating device according to the first embodiment of the present invention, the CIR register and a replica table are provided in the replica generating circuit for storing the calculated replicas. In this manner, the invention according to the first embodiment makes it possible to take a longer time for calculating the replicas, in comparison to the conventional digital data demodulating device, which can calculate the replicas any time according to the transmission speed. Accordingly, it becomes possible to use this digital data demodulating device in a high-speed operation circuit.

In the digital data demodulating device according to the first embodiment, it is assumed that the transmission data is modulated using BPSK. However, the digital data demodulating device according to the first embodiment can be easily applied to the transmission data which have been modulated in systems with other than BPSK.

Embodiment 2.

Figure 4:
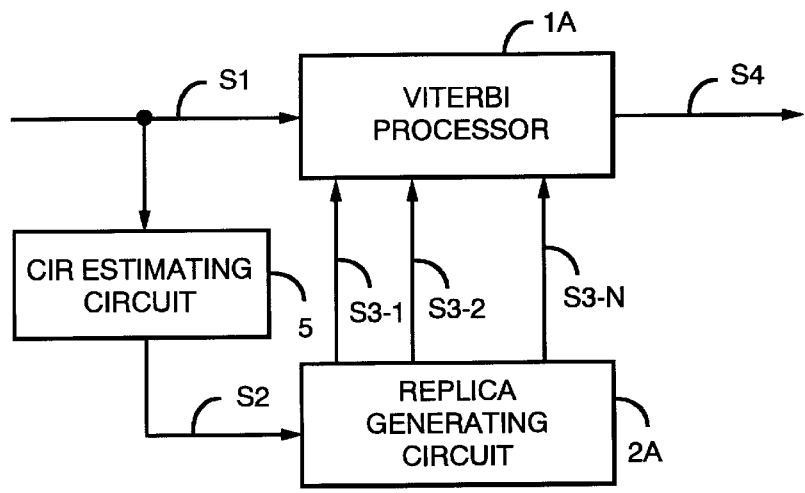
FIG. 4 illustrates a digital data demodulating device according to a second and third embodiments of the present invention.

A second embodiment of the present invention is explained in connection with FIG. 4, which illustrates an example of a digital data demodulating device. In FIG. 4, same or equivalent portions in FIGS. 1–3 are represented with same numbers, and repeated explanations of them are omitted In FIG. 4, a replica generating circuit 2A generates replicas S3-1 . . . , S3-N, for each block of the N-divided estimated CIR, from the estimated CIR S2. A viterbi processor 1A decides the transmission data from the received signal S1 and the replicas S3-1, . . . , S3-N for each block based on the viterbi algorithm, and outputs the decision data S4.

Figure 5:
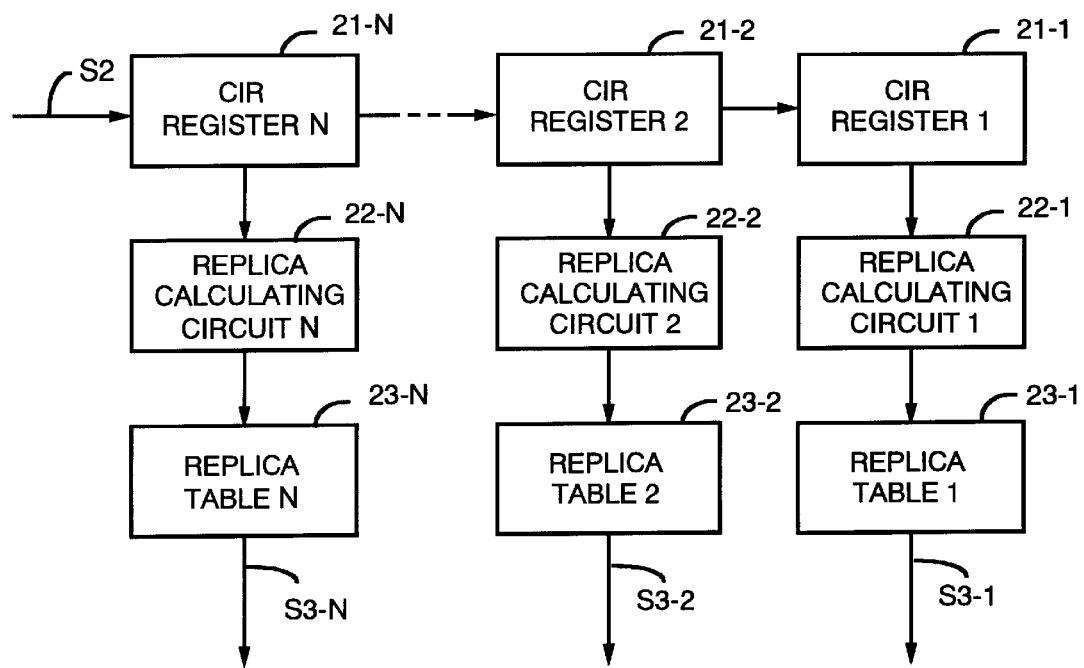
FIG. 5 illustrates a replica generating circuit located in the digital data demodulating device according to the second embodiment of the present invention.

FIG. 5 illustrates an example of the replica generating circuit 2A. In FIG. 5, same or equivalent portions in FIGS.

1–4 are represented with same numbers, and repeated explanation of them are omitted. CIR registers 21-1, . . . , 21-N divide the estimated CIR S2 into N blocks, and store the divided estimated CIR S2. Replica calculating circuits 22-1, . . . 22-N calculate a replica for each block from the estimated CIR, for each block, which are stored in the CIR registers 21-1, . . . , 21-N. Replica tables 23-1, . . . , 23-N stores the replicas, for each block, which have been calculated in the replica calculating circuit 22-1, . . . 22-N.

The operation of the replica generating circuit 2A is explained using FIG. 5. The CIR $C_1 C_2, \ldots, C_V$ for V taps are described as Bi, B2., Bv using the estimated CIR S2 which have been estimated in the CIR estimating circuit 5. The CIR registers 21-1, . . . , 21-N divides the estimated CIR S2 for V taps into N blocks, and store the divided CIR S2. In this example, for the sake of simplicity, $B_1, B_2, \ldots, B_V$ of the estimated CIR S2 are equally divided into N blocks. In other words, if W=V/N (assuming those numbers are integers), then the respective CIR registers 21-b (b=1, . . . , N) store the respective divided estimated CIR, that is, $B_{(b-1)*W+1}, \ldots, B_{(b-1)*W+W}$. For example, if V=4 and N=2, the CIR register 21-1 stores $B_1$ and $B_2$, and the CIR register 21-2 stores B3 and B4.

The replica calculating circuits 22-1, . . . , 22-N calculate a replica for each block based on the estimated CIR, corresponding to each block, stored in the CIR registers 21-1, . . . , 21-N. In other words, the replica calculating circuit 22-b (b=1, . . . , N) calculates the replica Rn (b, k') of the b-th block based on the estimated CIR, $B_{(b-1)*W+1}, \ldots, B_{(b-1)*W+W}$ of the b-th block stored in the CIR register 21-b, according to formula (5).

$$Rn(b, k') = \sum_{v=1}^{W} B_{(b-1)*W+v} J_{n-\{(b-1)*W+v-1\}} \quad (5)$$

$$(b = 1, 2, \ldots, N, k' = 1, 2, \ldots, 2^W)$$

In formula (5), when the transmission data are modulated in the BPSK, for example, the vector $(J_{n-(b-1)*W}, \ldots, J_{n-\{(b-1)*W+(W-1)\}})$ takes $2^W$ values between (0, . . . , 0) to (1, . . . , 1) corresponding to k' since the transmission data are represented in binary.

The replica table 23-b stores the replica $R_n(b, k')$ (k'=1, 2, . . . , $2^W$) corresponding to the b-th block calculated in the replica calculating circuit 22-b (b=1, . . . , N). The replica $R_n(b, k')$ of the b-th block, S3-b, are then output from the replica table 23-b.

Figure 6:
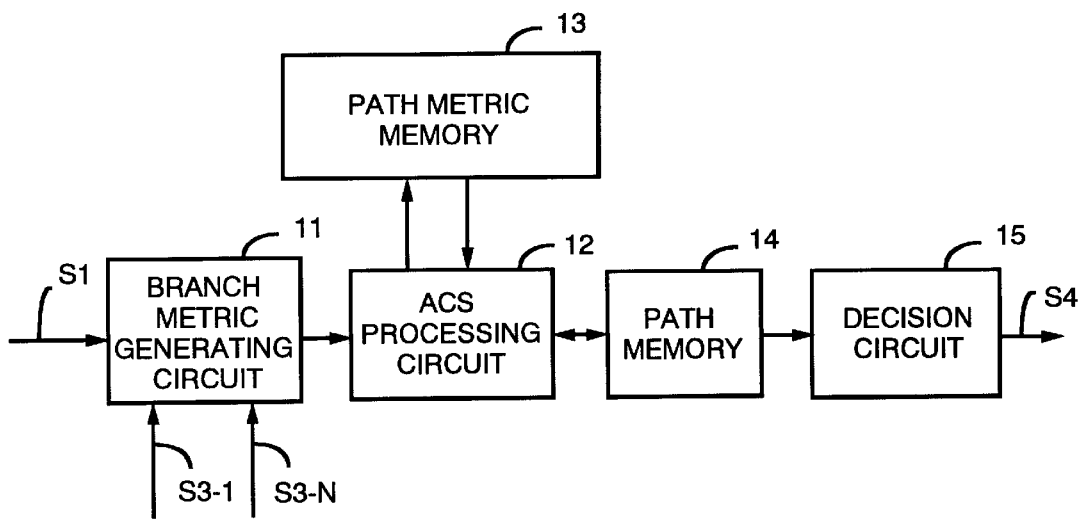
FIG. 6 illustrates a viterbi processor located in the digital data demodulating device according to the second, third, fifth and sixth embodiments of the present invention.

FIG. 6 shows an example of the viterbi processor 1A. In FIG. 6, equal or equivalent portions in FIGS. 1–5 are represented with the same numbers, and repeated explanations of them are omitted. A branch metric generating circuit 11 generates a branch metric corresponding to each branch illustrated in the trellis diagram, based on the received signal S1 and the replicas S3-1, . . . , S3-N for each block. An ACS processing circuit 12 performs ACS process based on the branch metric output from branch metric generating circuit 11. A path metric memory 13 stores the total sum of the branch metric included in the candidate paths of the past transmission data. A path memory 14 stores the candidate paths of the past transmission data sequence. A decision circuit 15 decides the transmission data based on the output of the path memory 14, and outputs the decision data S4.

The branch metric generating circuit 11 obtains and outputs $2^V$ branch metric En (k), which correspond to the respective branches illustrated on the trellis diagram, from the received signal S1 and the replicas S3-1, . . . , S3-N for each block. The branch metric En (k) are expressed in a formula (6), where the received signal S1 is represented as $r_n$, and replicas S3-1, . . . , S3-N for each block are represented as Rn (b, k').

$$E_n(k) = \left| r_n - \sum_{b=1}^{N} R_n(b, k) \right|^2 \quad (6)$$

$$(k = 1, 2, \ldots, 2^V, k' = 1, 2, \ldots, 2^W)$$

Formula (6) calculates the sum for b. That is, formula (6) adds the replica for each block and obtains the replica corresponding to each branch. In this formula, the k' in $R_n(b, k')$ are changed according to "b". There are $(2^W)^N = 2^V$ ways to combine the replica for each block and the replicas correspond to each branch illustrated on the trellis diagram.

Figure 21:
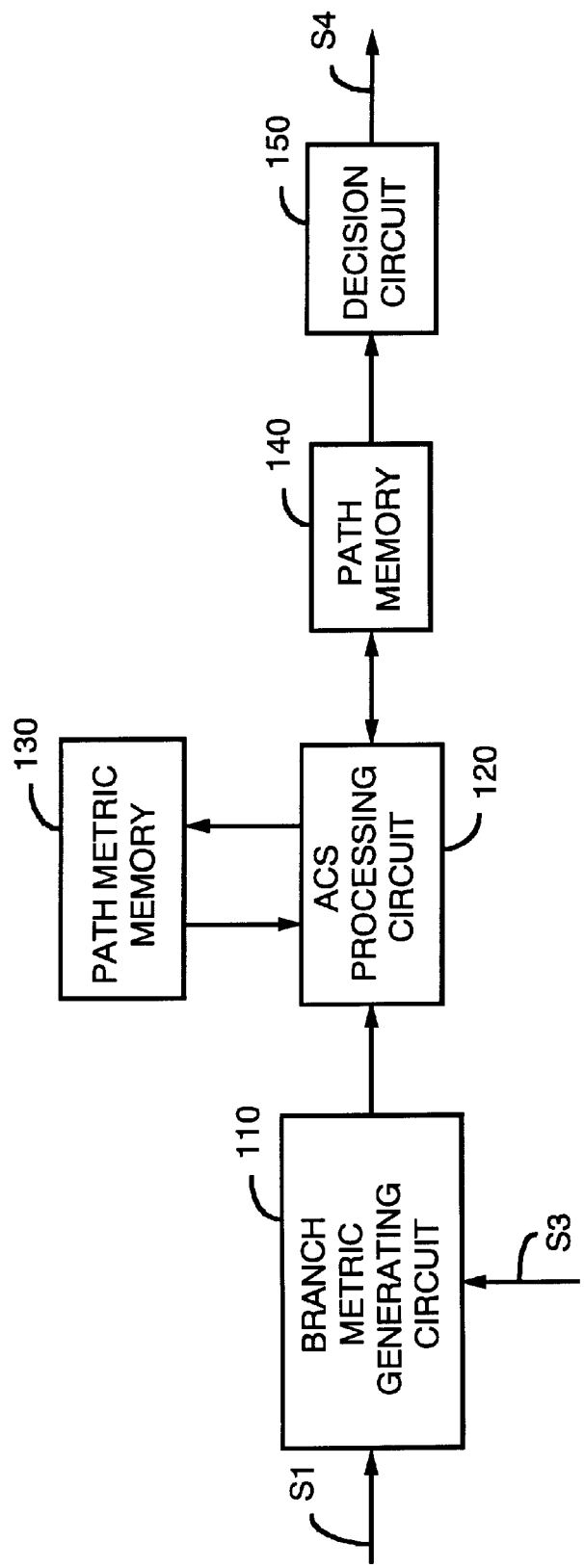
FIG. 21 illustrates a conventional viterbi processor located inside the digital data demodulating device of FIG. 20.

In the viterbi processor 1A of FIG. 6, the elements except for the branch metric generating circuit 11 are the same as those of the conventional viterbi processor illustrated in FIG. 21, and operate in the same manner as that in that of FIG. 21.

The estimated CIR S2, which is input to the replica generating circuit 2A, is estimated in the CIR estimating circuit 5. The estimation method, estimation timing and the timing for updating the contents of the replica tables 23-1, . . . , 23-N, which are located in the replica generating circuit 2, based on the estimate CIR, are similar to those in the first embodiment.

In the digital data demodulating device according to the second embodiment of the present invention, it is possible to reduce the size of the replica tables from $2^V$ to $N \times 2^{(V/N)}$, in comparison to the first embodiment, by dividing the estimated CIR into N blocks in the replica generating circuit. Moreover, in the device according to the second embodiment of the present invention, it is also possible to reduce the number of the adders approximately as same degree as that of the replica calculating circuit. In addition, it is possible to prevent the increase of the adders in number in the branch metric generating circuit of the viterbi processor, to approximately N times, thus the circuit scale of the entire digital data demodulating device can be reduced.

In the digital data demodulating device according to the second embodiment, the transmission data are assumed to be modulated by BPSK for the sake of explanation. However, the invention according to the second embodiment can be easily applied for the transmission data which are modulated in other systems than BPSK.

In addition, the estimated CIR has been assumed to be divided into equal N blocks for the sake of explanation. However, if V/N does not result in an integer, the division of the blocks does not have to be equal, and the invention of the second embodiment can be also easily applied in such cases.

Embodiment 3.

Figure 7:
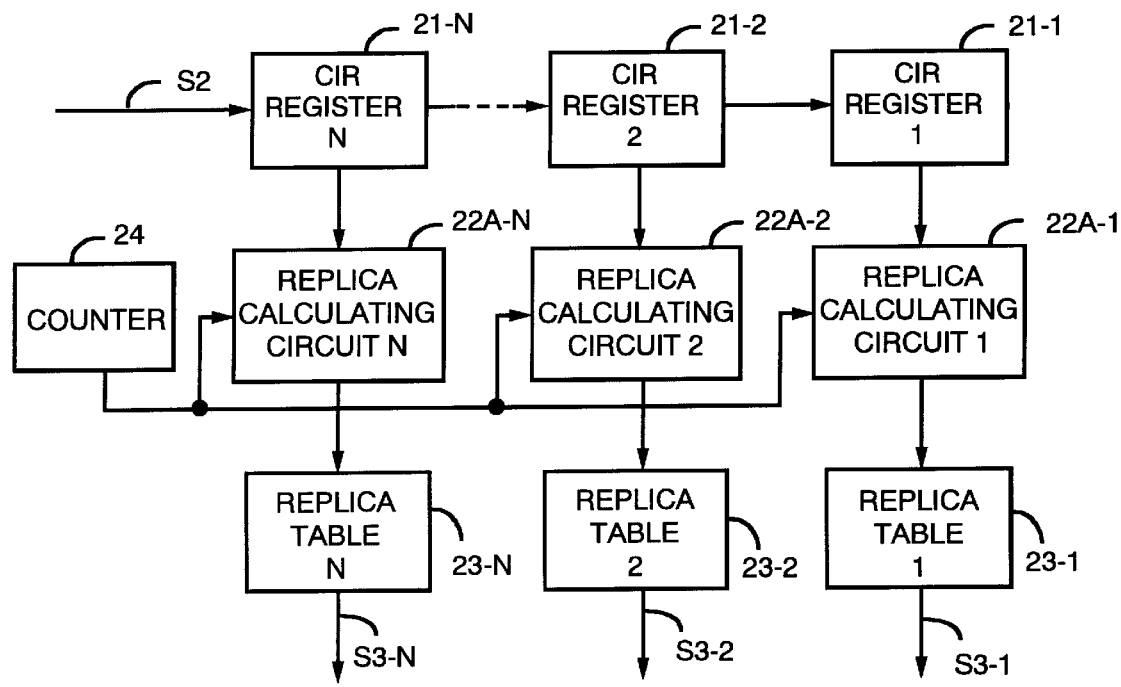
FIG. 7 illustrates a replica generating circuit located in the digital data demodulating device according to the third, fifth, sixth and seventh embodiments of the present invention.

A third embodiment of the present invention is explained. FIG. 7 shows an example of a replica generating circuit in a digital data demodulating device according to the third embodiment. The replica generating circuit of FIG. 7 is similar to that of, for example, FIG. 6. In FIG. 7, same or equivalent portions in FIGS. 1–6 are represented with same numbers, and repeated explanations of them are omitted. A counter 24 sequentially generates vectors of predetermined bits. Replica calculating circuits 22A-1, . . . , 22A-N calculate a replica for each block based on the estimate CIR for each block stored in the CIR registers 21-1, . . . , 21-N, and on the output from the counter 24.

The transmission data are assumed to be modulated using BPSK. In other words, it is assumed that the transmission data have two values. The operation of the replica generating circuit is explained using FIG. 7. CIR registers 21 -1, ..., 21-N divide the estimated CIR for V taps into N blocks and stores the divided CIR in the same manner as that in the second embodiment. Counter 24 has W bits, corresponding to the equally-divided N blocks of the estimated CIR S2 for V taps. The counter 24 sequentially generates $2^W$ W-bit vectors, that is, $(Jn_{-(b-1)*W}, \ldots, J_{n-\{(b-1)-W+(W-1)\}})$, from $(0, \ldots, 0)$ to $(1, \ldots, 1)$.

Replica calculating circuits 22A-1, ..., 22A-N calculate a replica for each block based on the estimated CIR for each block stored in the CIR registers 21-1, ..., 21-N, and on the output from the counter 24. In other words, the replica calculating circuit 22A-b (b=1, ..., N) calculates the replica Rn (b, k') of the b-th block, based on the estimated CIR of the b-th block stored in the CIR register 21-b, that is, $B_{(b-1)*W+1}, \ldots, B_{*(b-1)W+W}$, and on the output $(J_{n-(b-1)W}, \ldots, J_{n-\{(b-1)W+(W-1)\}})$ from the counter 24, by formula (7).

$$R_n(b, k') = \sum_{v=1}^{W} B_{(b-1)*W+v} J_{n-[(b-1)*W+(v-1)]} \quad (7)$$

$$(b = 1, 2, \ldots, N, k' = 1, 2, \ldots, 2^W)$$

In formula (7), the outputs from the counter 24, that is, $(J_{n-(b-1)*W}, \ldots, J_{n-\{(b-1)*W+(W-1)\}})$, are sequentially counted up from $(0, \ldots, 0)$ to $(1, \ldots, 1)$. According to this count-up, Rn (b, k') are sequentially calculated corresponding to k'.

The replica Rn (b, k') (k'=1,2, ..., $2^W$) of the b-th block, which have been calculated in the replica calculating circuit 22A-b (b=1, ..., N), are stored in the replica table 23-b, and the replica Rn (b, k') of the b-th block, S3-b, are output from the replica table 23-b.

The viterbi processor according to the third embodiment of the present invention is the same as that in the second embodiment of the present invention and operates in the same manner. In the third embodiment, the estimated CIR S2, which is input to the replica generating circuit of FIG. 7, is estimated in the CIR estimating circuit 5. The estimating method, estimate timing and the timing for updating the contents of the replica tables 23-1, ..., 23-N in the replica generating circuit, based on the estimated CIR, are similar to those according to the first embodiment.

In the digital data demodulating device according to the third embodiment of the present invention, a counter sequentially generates a vector of predetermined bits in the replica generating circuit, and takes time to sequentially calculate the replicas for each block, according to a vector generated from the counter. Thus, in comparison to the second embodiment, it is possible to reduce the number of the adders in the replica calculating circuit to $\frac{1}{2}^{(V/N)}$.

In the digital data demodulating device according to the third embodiment of the present invention, the transmission data is assumed to be modulated using BPSK for the sake of explanation. However, the device according to the third embodiment can be easily applied for the transmission data which are modulated in systems with other than BPSK.

In addition, the estimated CIR is also assumed to be equally divided into N blocks for the explanation. If V/N does not result in an integer, the estimated CIR does not have to be equally divided, and the device according to the third embodiment can also be easily applied in such cases. In addition, the estimate CIR do not necessary have to be divided (when N=1).

Embodiment 4.

Figure 8:
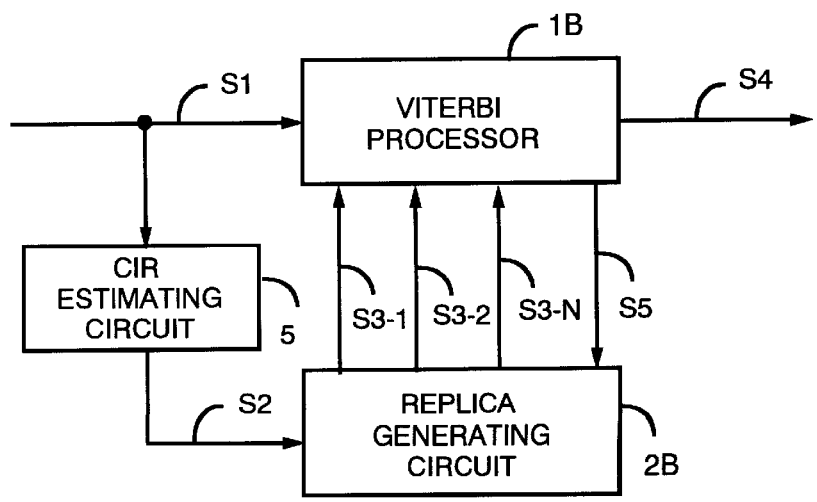
FIG. 8 illustrates a DFSE type digital data demodulating device according to the fourth embodiment of the present invention.

A fourth embodiment of the present invention is explained. FIG. 8 illustrates an example of a digital data demodulating device according to the fourth embodiment of the present invention. In FIG. 8, same or equivalent portions in FIGS. 1–7 are represented with same numbers, and repeated explanations of them are omitted.

The digital data demodulating device of FIG. 8 belongs to a type called DFSE (Decision Feedback Sequence Estimation). In FIG. 8, a replica generating circuit 2B generates replicas S3-1, ..., S3-N for each block, formed by dividing the replica of the received signal into N blocks, based on surviving paths S5 corresponding to each state which is output from the viterbi processor 1B, and on the estimated CIR S2. A viterbi processor 1B decides the transmission data based on the received signal S1 and replica S3-1, ..., S3-N for each block using the viterbi algorithm, and outputs decision data S4. In addition, the viterbi processor 1B outputs the surviving paths 55, which correspond to each state.

In a DFSE type digital data demodulating device, the definition of states is different from that used in the conventional example, or in the preceding embodiments. In channel model having ISI illustrated in FIG. 18, a state is defined as a combination of transmission data for past (Va-1) symbol period, which is closer to the current time, of all past transmission data stored in the shift register 61. However, in this case, Va is smaller than V, that is, Va<V. Assuming that the transmission data are modulated using BPSK and have two values, the number of states $N_S$ is expressed as $N_S=2^{Va-1}$.

Corresponding to the above definition of a state, a trellis diagram is also defined. The branch $S_{n-1}$/Sn, which extends from the time n-1 to the time n on the trellis diagram is determined by the transmission data S61 of FIG. 18, and by combination of the past transmission data of (Va-1) symbol period stored in the shift register 61. In other words, a vector $(J_n, J_{n-1}, \ldots, J_{n-(va-1)})$ have $2^{Va}$ ways, and correspondingly, the branches Sn-1/Sn extended from the time n-1 to the time n takes $2^{Va}$ values. A replica of the received signal is calculated corresponding to respective $2^{Va}$ branches illustrated in the trellis diagram. The replica $R_n(k)$ corresponding to the k-th branch (k=1,2, ..., $2^{Va}$) is expressed with the formula (8).

$$R_n(k) = \sum_{v=1}^{Va} B_v J_{n-(v-1)} + \sum_{v=Va+1}^{V} B_v J^e_{n-(v-1)} \quad (8)$$

$$(k = 1, 2, \ldots, 2^{Va})$$

In formula (8), the vector $(J_n, J_{n-1}, J_{n-(va-1)})$ takes $2^{Va}$ different values from $(0, 0, \ldots, 0)$ to $(1, 1, \ldots, 1)$ corresponding to k. The vector $(J^e_{n-Va}, J^e_{n-(Va+1)}, \ldots, J^e_{n-(V-1)})$ is a candidate of the past transmission data on the surviving path corresponding to the one period prior state,, which the respective branches are connected. The DFSE type digital data demodulating device reduces the number of states in the viterbi algorithm, and all CIR are reflected in the replica $R_n(k)$.

Figure 9:
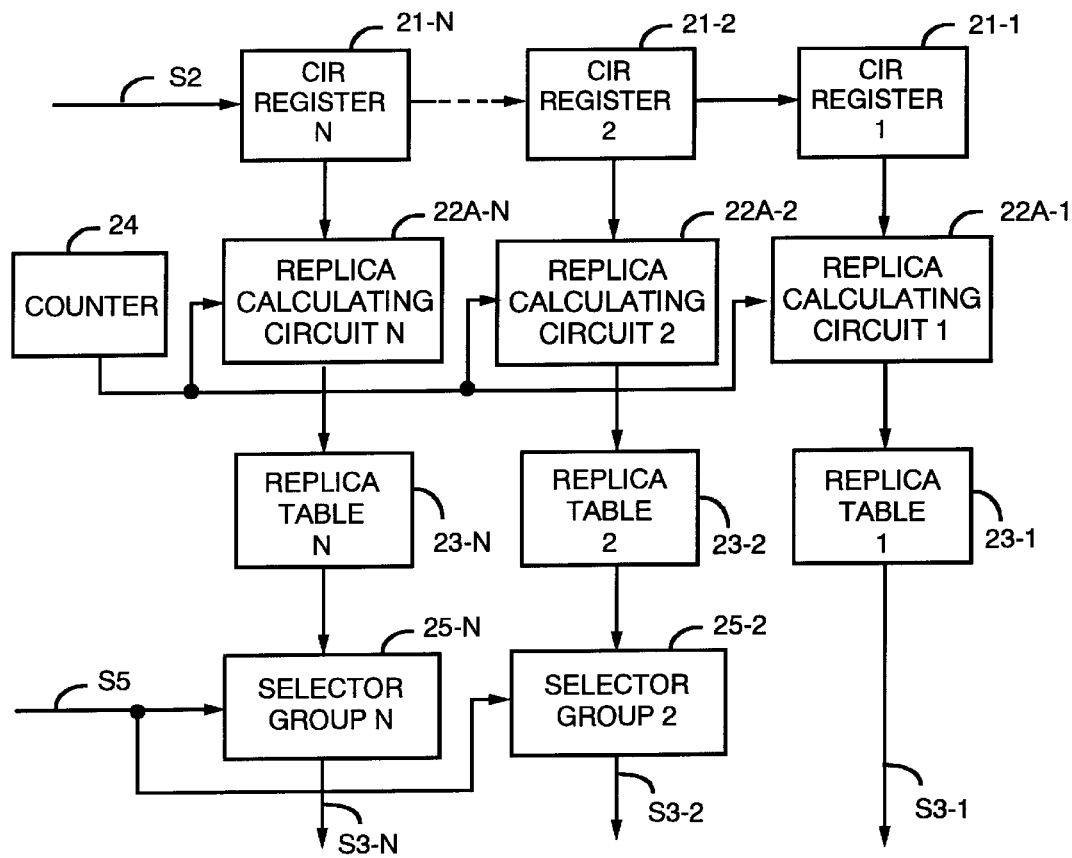
FIG. 9 illustrates a replica generating circuit located in the DFSE type digital data demodulating device according to the fourth embodiment of the present invention.

FIG. 9 shows an example of the replica generating circuit 2B. In FIG. 9, same or equivalent portions in FIG. 1–FIG. 8 are represented with same numbers, and repeated explanations of them are omitted. A selector group 25-2, ..., 25-N selects a replica for each block output from the replica tables 23-2, ..., 23-N, based on the surviving path S5, and outputs the replicas S3-2, ..., 53-N for each block which corresponds to each branch illustrated on the trellis diagram. A replica S3-1 is a first block output from the replica table 23-1.

The operation of the replica generating circuit 2B is explained. CIR registers 21-1, ..., 21-N, replica calculating circuits 22A-1, ..., 22A-N, replica tables 23-1, ..., 23-N and a counter 24, which are all shown in FIG. 9, operate in the similar manner as that of the third embodiment of the present invention. In other words, the replica calculating circuits 22A-1, ..., 22A-N calculate a replica $R_n(b, k')$ ($k'=1, 2, ..., 2^W$) for each block based on the estimated CIR for each block stored in the CIR registers 21-1, ..., 21-N and on the output from the counter 24 according to formula (7). The replica tables 23-1, ..., 23-N store the calculated replica $R_n(b, k')(k'=1,2, ..., 2^W)$.

For the sake of simplicity, the number W is assumed such as W=Va. The replica table 23-1 outputs a replica $R_n(1, k')$ ($k'=1, 2, ..., 2^{Va}$), S3-1 of the first block corresponding to each branch illustrated on the trellis diagram (,that is corresponding to k). Since k'=1, 2, ..., 2 correspond to each branch numbers k=1, 2, ..., $2_{Va}$, respectively, $R_n(1, k')$ is expressed as $R_n(1, k')=R_n(1, k)$. In the following explanation, $R_n(1, k)$ is described as $RS_n(1, k)$. $RS_n(1, k)$ are equal to the first item of the replica $R_n(k)$, which is expressed in formula (8).

The selector group 25-b (b=2,3, ..., N) selects the replica S3-b of the b-th block, having $2^{Va}$ values corresponding to each branch illustrated in the trellis diagram (that is, corresponding to k=1,2, ..., 2), from the replicas of the b-th block having $2^{Va}$ values, which are output from the replica table 23-b according to the surviving path S5. The replica RSn (b, k) of the b-th block corresponding to the k-th branch selects $R_n(b, k')$ corresponding to the past transmission data candidates ($J^e_{n-(b-1)W}, ..., J^e_{n-\{b-1)W+(W-1)\}}$) oil the surviving path corresponding to the one period prior state connected to the k-th branch, from $2^{Va}$ Rn (b, k') (k'=1, 2, ..., $2^{Va}$), which are output from the replica table 23-b, and are indicated as RSn (b, k).

Figure 10:
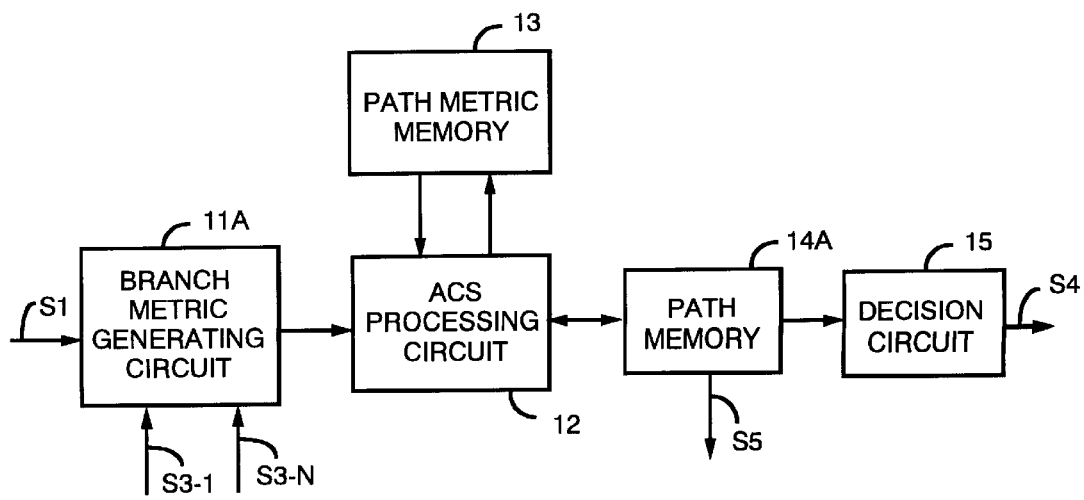
FIG. 10 illustrates a viterbi processor located in the DFSE type digital data demodulating device according to the fourth embodiment of the present invention.

FIG. 10 shows an example of the viterbi processor 1B. A branch metric generating circuit 11A and a path memory 14A of FIG. 10 is different from those of FIG. 6 of the second embodiment In FIG. 10, same or equivalent portions in FIGS. 1–9 are represented with same numbers, and repeated explanations of them are omitted. A branch metric generating circuit 11A generates a branch metric for each branch, which is illustrated in the trellis diagram, based on the received signal S1 and replicas S3-1, ..., S3-N for each block. A path memory 14A stores candidate paths of the past transmission data sequence, and outputs the surviving path S5 corresponding to each state for the replica generating circuit 2B.

In the branch metric generating circuit 11A, $2^{Va}$ branch metric En (k) (k=1,2, ..., $2^{Va}$), corresponding to each branch illustrated in the trellis diagram are obtained from the received signal S1 and replica S3-1, ..., 53-N for each block, and the obtained branch metric is output. The branch metric En (k) is expressed by formula (9) when the received signal S1 is $r_n$, and the replicas S3-1, ..., S3-N for each block are RSn (b, k).

$$E_n(k) = \left| r_n - \sum_{b=1}^{N} RS_n(b, k) \right|^2 \quad (9)$$

$(k = 1, 2, ..., 2^{Va})$

In formula (9), the sum is calculated for b as shown in the following formula (10). That is, the sum of the replicas for each block is calculated to obtain replicas corresponding to each branch.

$$R_n(k) = \sum_{b=1}^{N} RS_n(b, k) \quad (10)$$

In the viterbi processor 1B which is illustrated in FIG. 10, the operation of the elements other than branch metric generating circuit 11A is the same as those in the viterbi processor 1A in FIG. 4. In this case, however, the pass memory 14A outputs the surviving path S5 corresponding to the respective states.

The estimated CIR S2 is estimated in the estimating circuit 5, and output to the replica generating circuit 2B. The estimating method, estimate timing and timing for updating contents of the replica tables 23-1, ..., 23-N in the replica generating circuit 2B based on the estimated CIR are similar to those in the fist embodiment.

It is possible to apply the digital data demodulating device according to the fourth embodiment to a DFSE type digital data demodulating device, by providing the selector group in the replica generating circuit for selecting a replica for each block, which is output from the replica tables, according to the surviving paths. It is a well-known that the DFSE type digital data demodulating device can be achieved by a smaller circuit scale and smaller memory capacity (path memory and path metric memory). Therefore, the invention according to the fourth embodiment can achieve similar effects obtained in the second and third embodiments, and further can reduce the circuit scale and the memory capacity.

In the example explaining the digital data demodulating device according to the fourth embodiment, the replica generating circuit includes a counter. However, it is also possible to use a replica generating circuit without a counter in the device of the fourth embodiment, in the same manner as in the first and second embodiments.

Moreover, in the above example, it is assumed that the transmission data are modulated using BPSK for the purpose of simple explanation. However, the invention according to the fourth embodiment can be easily applied to such a case that the transmission data are modulated using digital modulation methods other than BPSK.

In addition, in the above example, it is assumed that the estimating CIR is equally divided into N blocks for the purpose of simple explanation. However, if V/N does not result in an integer, the division does not have to be equal, and the invention according to the fourth embodiment can be applied easily even in such cases. Moreover, it is not always necessary to divide the estimating CIR (if N=1).

Furthermore, in the above example, V/N=Va is assumed for the sake of simple explanation. However, it can also be V/N Va, and the invention according to the fourth embodiment can also be applied easily in such cases.
Embodiment 5.

Figure 11:
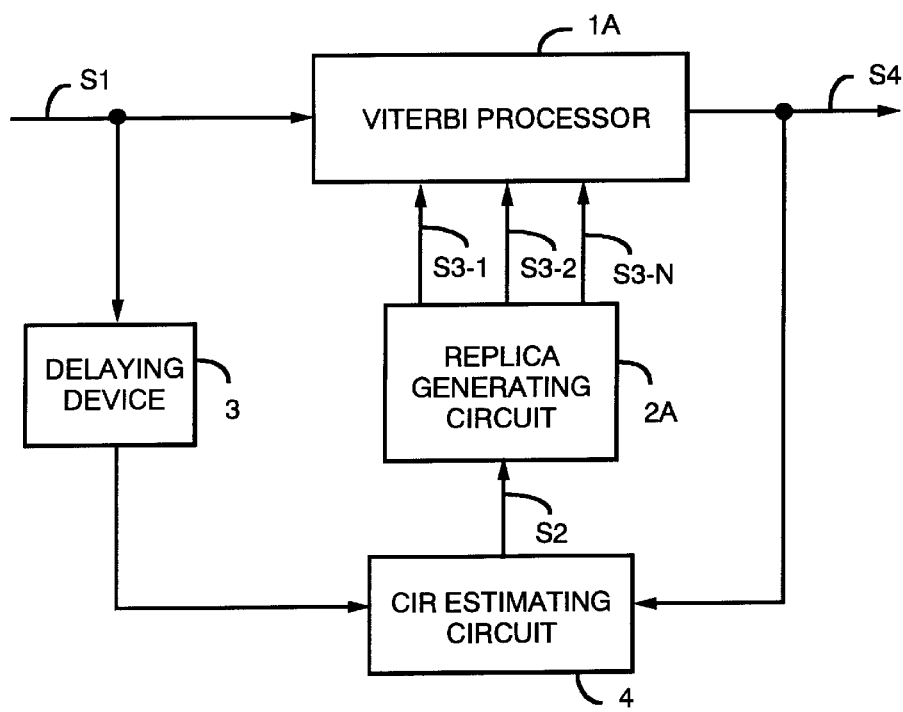
FIG. 11 illustrates an adaptive digital data demodulating device according to the fifth and seventh embodiment of the present invention.

A fifth embodiment of the present invention is explained in connection with FIG. 11, which illustrates an example of a digital data demodulating device. In FIG. 11, same or equivalent portions in FIGS. 1–10 are represented with the same numbers, and repeated explanations of them are omitted.

The digital data demodulating device of FIG. 11 is an adaptive type digital data demodulating device, and adapts to the time variation of channel. Thus, the CIR is estimated sequentially using the received signal and the decision data. In FIG. 11, a delaying device 3 delays the received signal S1 by the delay time (this delay is called as decision delay) from the input of the received signal to the output of the decision data S4 at a viterbi processor 1A. A CIR estimating circuit 4 estimates CIR sequentially based on the delayed received signal output from the delaying device 3 and on the decision data S4 output from the viterbi processor 1A. CIR S2 is estimated in the CIR estimating circuit 4.

Figure 12:
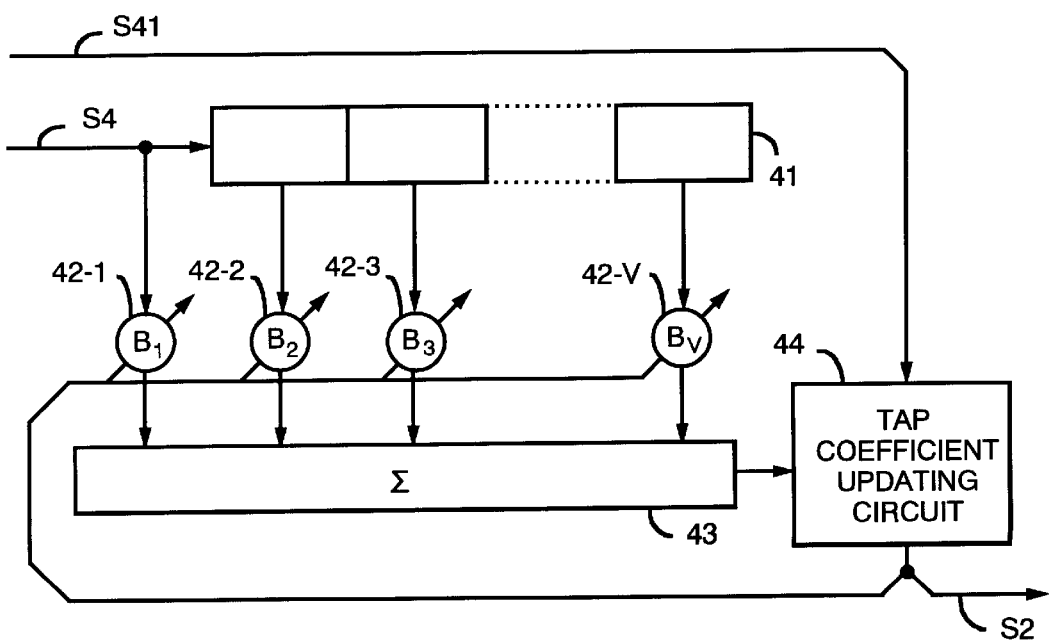
FIG. 12 illustrates a CIR estimating circuit located in adaptive digital data demodulating device according to the fifth embodiment of the present invention.

FIG. 12 illustrates an example of the CIR estimating circuit 4. In FIG. 12, the delayed received signal S41 is output from delay device 3. The shift register 41 has (V−1) stages, and is sequentially input with decision data S4. Multipliers 42-1, . . . , 42-V multiply the decision data S4 and the output from the shift register 41 by the tap coefficients $B_1$, $B_2$, . . . , $B_V$, which are the estimated CIR, respectively. An adder 43 adds the respective outputs from the multipliers 42-1, . . . , 42-V. A tap coefficient updating circuit 44 obtains an error between the output from the adder 43 and the delayed received signal S41, updates the tap coefficients $B_1$, $B_2$, . . . , $B_V$ based on the obtained error, and outputs the updated tap coefficients as an estimated CIR S2.

Figure 18:
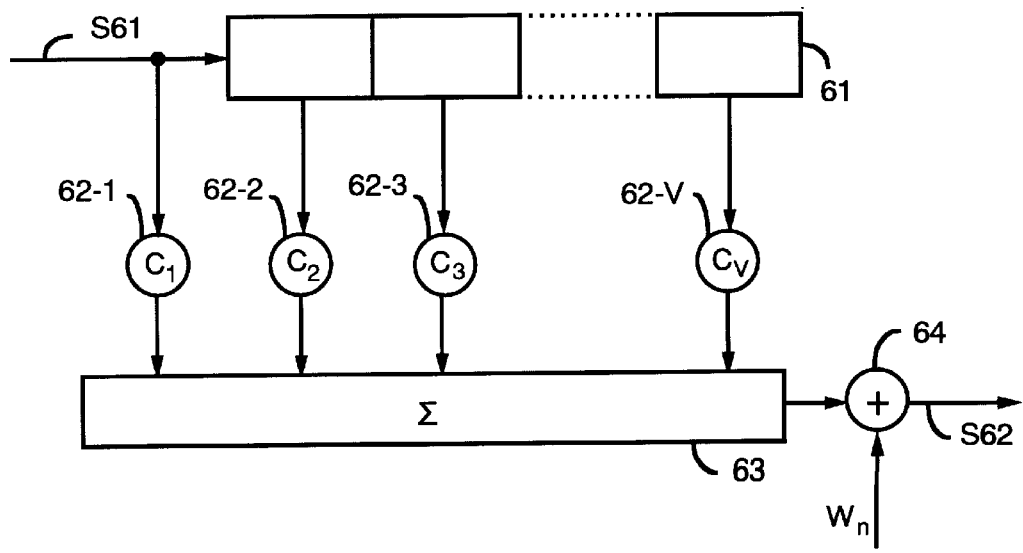
FIG. 18 illustrates a conventional model of the channel having ISI to explain of the viterbi algorithm.
Figure 19:
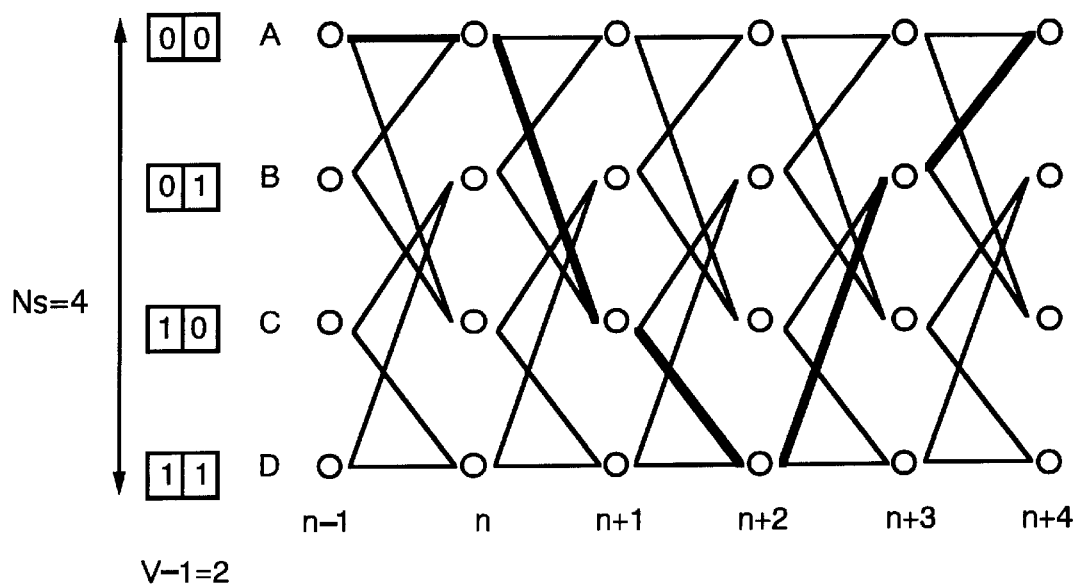
FIG. 19 is a conventional trellis diagram to explain of the viterbi algorithm.

The CIR estimating circuit 4 sequentially estimates $C_1$, $C_2$, . . . , $C_V$, which are the CIR for V taps in the channel model having ISI of FIG. 18. In the example of the CIR estimating circuit 4 of FIG. 12, an adaptive algorithm called LMS (Least Mean Square) algorithm is used for CIR estimation. The operation of the CIR estimating circuit 4 is explained. In FIG. 12, decision data S4 is obtained by deciding the transmission data corresponding to the received signal S41 which is delayed in the delaying device 3. The received signal S41 is the transmission data received via the transmission model illustrated in FIG. 18, and expressed in formula (1) when the received signal S41 is $r_n$ and the noise is $w_n$. Formula (1) is again shown below as formula (11).

$$r_n = \sum_{v=1}^{V} C_v I_{n-(v-1)} + w_n \quad (11)$$

The output from the adder 43 is obtained by estimating the received signal S41, which is denoted as $r_n$ in formula (11), and this output from the adder is denoted as $r^e_n$ here. The output $r^e_n$ from the adder 43 is expressed below in formula (12), using $I^e_n$ which is the decision data S4 corresponds to $r_n$ of the received signal S41, $I^e_{n-1}$, $I^e_{n-2}$ and $I^e_{n-(v-1)}$ which are the outputs from the shift register 41 and the tap coefficients $B_1$, $B_2$, . . . , $B_V$ which are the estimated CIRs.

$$r^e_n = \sum_{v=1}^{V} B_v I^e_{n-(v-1)} \quad (12)$$

The tap coefficient updating circuit 44, calculates the error en represented in formula (13) based on the $r_n$ and $r_{en}$, where $r_n$ is the received signal S41 which is expressed in formula (11), and $r^e_n$ is the output from the adder 43 which is expressed in formula (12).

$$e_n = r_n - r^e_n \quad (13)$$

Using the obtained error $e_n$, the tap coefficients $B_1$, $B_2$, . . . , $B_V$, which are the estimated CIRs, are updated from a formula (14).

$$B^v(n+1) = B^v(n) + \mu e_n I^{ve}_n \quad (14)$$

In formula (14), the tap coefficients vector ($B_1$, $B_2$, . . . , $B_V$) before the update is denoted as $B^v(n)$, the tap coefficients vector ($B_1$, $B_2$, . . . , $B_V$) after the update is denoted as $B^v(n+1)$, step size parameter is denoted as $\mu$, and decision data vector ($I^e_n$, $I^e_{n-1}$, $I_{en-(v-1)}$) is denoted as $I^{ve}_n$. The updated tap coefficients $B_1$, $B_2$, . . . , $B_V$ are output as estimated CIR S2.

The internal constructions of the replica generating circuit 2A and the viterbi processor 1A are the same as those in the third embodiment explained above. The operation and the processing timing in the digital data demodulating device according to the fifth embodiment are explained using FIGS. 7, 11 and 13.

Figure 13:
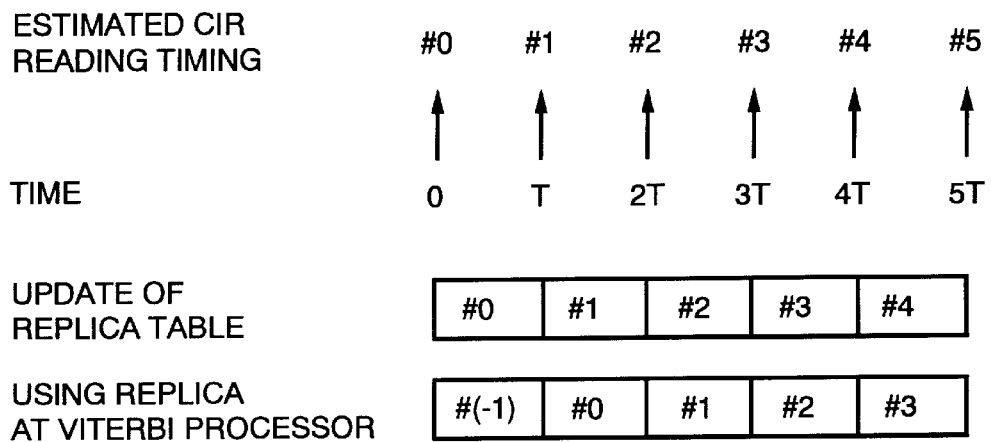
FIG. 13 illustrates an update timing flow of the replica tables located in the adaptive digital data demodulating device according to the fifth, sixth and seventh embodiments of the present invention.

The estimated CIR S2 output from the CIR estimating circuit 4 is read out and stored in the CIR registers 21-1, . . . , 21-N in the replica generating circuit 2A using a specific timing. The contents of the replica tables 23-1, . . . , 23-N are updated based on the estimated CIR stored in the CIR registers 21-1, . . . , 21-N. FIG. 13 illustrates an example of the timing flow of this updating process. In FIG. 13, the time required for the replica generating circuit 2A, from reading out of the estimated CIR S2 into the CIR registers 21-1, . . . , 21-N to updating the contents of replica tables 23-1, . . . , 23-N, is defined as T. In the replica generating circuit 2A, the CIR registers 21-1, . . . , 21-N read out the estimated CIR S2 for each time T. For example, the read out is carried out at time 0, T, 2T, 3T, . . . .

In FIG. 13, the estimated CIR S2 which are read out at time 0, T, 2T, 3T, . . . , are represented by #0, #1, #2, #3, . . . , respectively. The replica generating circuit 2A calculates a replica for each block based on the estimated CIR #0 during time 0 to time T, and updates the contents of the replica tables 23-1, . . . , 23-N at time T. The updated replicas S3-1, . . . , S3-N for each block are used in the viterbi processor 1A between time T and time 2T. This updating flow is repeated in the cycle of time T.

In the digital data demodulating device according to the fifth embodiment of the present invention, it becomes possible to make the time longer for calculating the replicas, by following the time variation of the channel by estimating sequentially CIR in the CIR estimating circuit, reading out the estimated CIR in a specified timing using the CIR registers and replica tables in the replica generating circuit, and updating the replica tables. In this manner, the adaptive digital data demodulating device can be applied to a high speed operating circuit In addition, it is possible to obtain an adaptive digital data demodulating device in a practical circuit scale by dividing the estimated CIR into N blocks in the replica generating circuit.

In the explanation of the digital data demodulating device according to the fifth embodiment of the present invention, the CIR is estimated only in the CIR estimating circuit. However, this estimation in the CIR estimating circuit may be accompanied by the method using a known data sequence, in the similar manner as that of the first embodiment. For example, in one data period of FIG. 3, CIR may be estimated by the method using a known data sequence, and this estimated CIR may be used as an initial value of the estimated CIR, then the estimate CIR may be estimated sequentially in the CIR estimating circuit every time the received signal is received. Moreover, although the CIR estimating circuit uses an LMS algorithm in the explanation of the fifth embodiment above, RLS (Recursive Least Squares) algorithm, or any other adaptive algorithms may also be used.

Although, in the above explanation, it is assumed that the transmission data is modulated using BPSK, the device of the fifth embodiment can also be applied easily even in a case that transmission data are modulated using methods other than BPSK.

Moreover, although the estimated CIR is assumed to be equally divided into N blocks in the explanation above, the division does not have to be equal in the case such as that V/N is not resulting in an integer, and the invention according to the fifth embodiment can also be applied easily even in such case. In addition, the estimated CIR does not always have to be divided at all (when N=1).

Although, in the above explanation, the replica generating circuit 2A includes the counter, the replica generating circuit does not have to include a counter, in the similar manner as that in the first and the second embodiments.

In addition, the invention according to the fifth embodiment can be applied to a digital data demodulating device of DFSE type, in the same manner as that in the fourth embodiment.

Embodiment 6.

Figure 14:
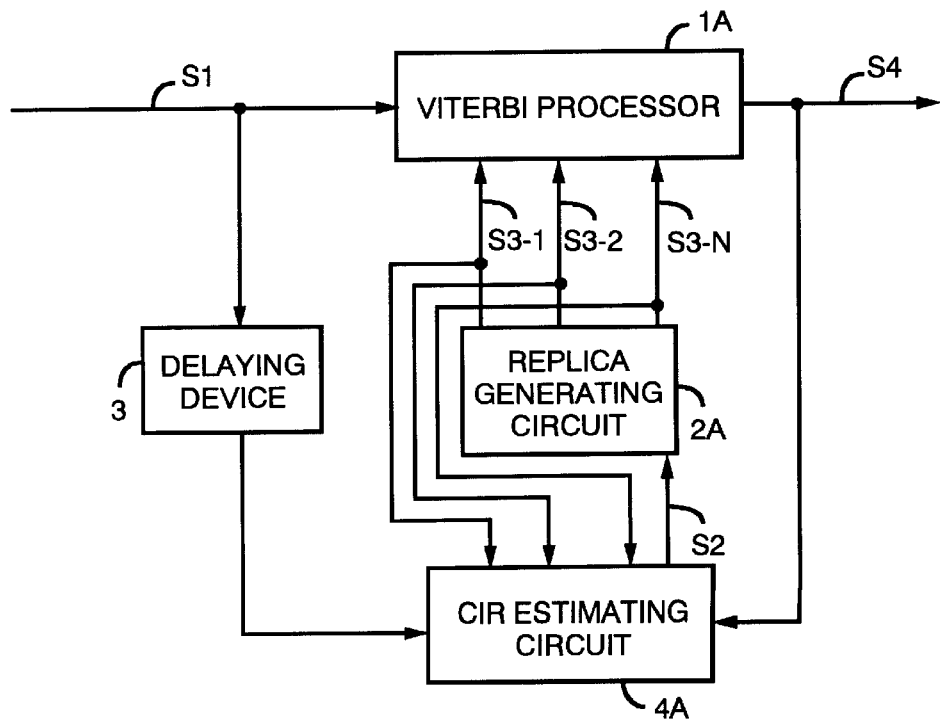
FIG. 14 illustrates an adaptive digital data demodulating device according to the sixth embodiment of the present invention.

A sixth embodiment of the present invention is explained in connection with FIG. 14, which illustrates an example of a digital data demodulating device according to the sixth embodiment of the present invention. In FIG. 14, same or equivalent portions in FIGS. 1–FIG. 13 are represented with same numbers, and repeated explanations of them are omitted.

The demodulating device of FIG. 14 is an adaptive type digital data demodulating device and adapts the time variation of the channel, and CIR is sequentially estimated using received signal and decision data. In FIG. 14, an CIR estimating circuit 4A estimates CIR sequentially based on the received signal output from the delaying device 3, the decision data S4 output from the viterbi processor 1A, and the replicas S3-1, . . . , S3-N for each block output from the replica generating circuit 2A. CIR estimating circuit 4A estimates CIR S2.

Figure 15:
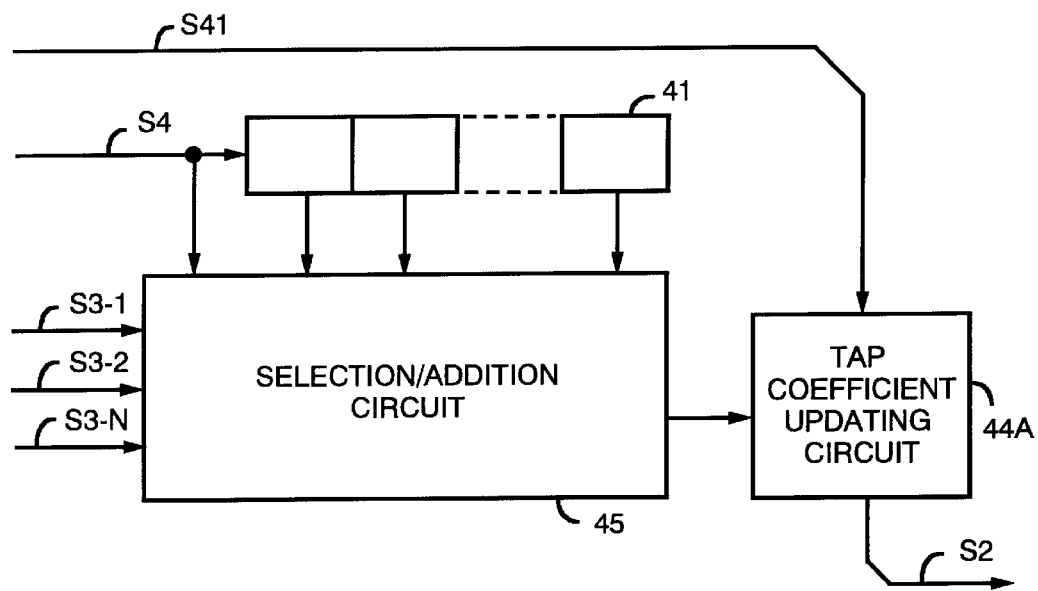
FIG. 15 illustrates a CIR estimating circuit located in adaptive digital data demodulating device according to the sixth embodiment of the present invention.

FIG. 15 shows an example of the CIR estimating circuit 4A according to the sixth embodiment In FIG. 15, same or equivalent portions in FIG. 1–FIG. 14 are represented with same numbers, the repeated explanation of them are omitted. A selection/addition circuit 45 selects one of the replicas S3-1, . . . , S3-N for each block, based on the delayed received signal S41 and the output from the shift register 41, and adds the selected replicas. A tap coefficient updating circuit 44A obtains the error between the output from the selection/addition circuit 45 and the delayed received signal S41, updates the tap coefficient $B_1, B_2, \ldots, B_V$ based on the obtained error, and outputs the updated tap coefficients as a estimated CIR S2.

The CIR estimating circuit 4A sequentially estimates $C_1, C_2, \ldots, C_V$, which are CIR for V taps in the channel model having an ISI, which is illustrated in FIG. 18. In the example of the CIR estimating circuit 4A, shown in FIG. 15, an LMS algorithm is used for the estimation of the CIR. The operation of the digital data demodulating device according to the sixth embodiment is explained. In FIG. 15, the decision data S4 is decided transmission data corresponding to the received signal (delayed in the delaying device 3) S41. The received signal S41 is the transmission data received via the channel model of FIG. 18, and the received signal S41 can be expressed in formula (1), where the received signal S41 is $r_n$ and noise is $w_n$.

The selection/addition circuit 45 receives Rn (b, k') (b=1, . . . , N, k'=1,2, . . . , $2^W$) of the $2^W$ replicas S3-1, . . . , S3-N, which correspond to each block. Based on the decision data $I^e_n$ S4 and the outputs $I^e_{n-1}, \ldots, I^e_{n-(V-1)}$ from the shift register 41, the selection/addition circuit 45 selects a replica $RC_n$ (b) for each block. In the b-th block, $RC_n$ (b) shown in formula (15) is selected.

$$RC_n(b) = \sum_{v=1}^{W} B_{(b-1)*W+v} I^e_{n-\{(b-1)*W+v-1\}} \quad (15)$$

$(b = 1, 2, \ldots, N)$

The selection/addition circuit 45 adds the $RC_n$ (b) selected for each block according to a formula (16), and outputs it as a result.

$$r^e_n = \sum_{b=1}^{N} RC_n(b) \quad (16)$$

In formula (16), $r^e_n$ corresponds to the estimated $r_n$ of the received signal S41. According to formula (17), the tap coefficient updating circuit 44A calculates an error $e_n$ from $r_n$ of the received signal S41 expressed in formula (1), and the output $r^e_n$ from the selection/addition circuit 45 expressed in formula (16).

$$e_n = r_n - r^e_n \quad (17)$$

The tap coefficient updating circuit 44A updates the tap coefficients $B_1, B_2, \ldots, B_V$, which are the estimated CIR, using the obtained error $e_n$, according to formula (18).

$$B^v(n+1) = B^v(n) + \mu e_n I^{ve}_n \quad (18)$$

Where, $B^v(n)$ represents the tap coefficients vector ($B_1, B_2, \ldots, B_V$) before the update, $B^v(n+1)$ represents the tap coefficients vector ($B_1, B_2, \ldots, B_V$) after the update, $\mu$ represents the step size parameter, and $I^{ve}_n$ represents the decision data vector ($I^e_n, I^e_{n-1}, \ldots, I^e_{n-(V-1)}$). The updated tap coefficients $B_1, B_2, \ldots, B_V$ are output as estimated CIR S2.

The replica generating circuit 2A and the viterbi processor IA are the same as those in the fifth embodiment of the present invention.

The estimated CIR S2 output from the CIR estimating circuit 4A is read and stored, for example, into the CIR registers 21-1, . . . , 21-N of FIG. 7 which are located inside the replica generating circuit 2A at specific timing. Based on the estimated CIR stored in the CIR registers 21-1, . . . , 21-N, contents of replica table 23-1, . . . , 23-N are updated. The update may be performed according to the timing flow illustrated in FIG. 13 explained in the fifth embodiment of the present invention.

In the digital data demodulating device according to the sixth embodiment of the present invention, it is possible to reduce the number of adders, and to prevent processing delay when compared with the fifth embodiment, by using the output from the replica generating circuit in the CIR estimating circuit. Moreover, similar effects are also obtained to those in the fifth embodiment.

In the explanation above, although CIR is solely estimated by the CIR estimating circuit according to the digital data demodulating device of the sixth embodiment of the present invention, the method using the known data sequence may be used in the same manner as that in the fifth embodiment of the present invention. In addition, although an LMS algorithm is used in the CIR estimating circuit in the explanation above, it may be substituted by RLS algorithm, or by any other adaptive algorithms.

In addition, in the explanation above, it is assumed that the transmission data is modulated using BPSK. However, the device according to the sixth embodiment may also be applied to cases that the transmission data are modulated in the digital modulation schemes other than BPSK.

Moreover, although it is assumed that the estimated CIR is equally divided into N blocks in the explanation above, the division of the estimated CIR does not have to be equal, in case such as when V/N does not result in an integer. The device according to the sixth embodiment can also be applied in such case easily. It is also possible not to divide the estimated CIR at all (when N=1).

In the sixth embodiment of the present invention, the replica generating circuit 2A includes a counter. However, a replica generating circuit does not have to include a counter, in the same manner as that in the first or the second embodiment of the present invention.

In addition, the device according to the sixth embodiment may also be applied to a DFSE type digital data demodulating device, such as one used for the fourth embodiment of the present invention.

Embodiment 7.

A digital data demodulating device according to the seventh embodiment of the present invention is an adaptive type digital data demodulating device, and the viterbi processor is different from the adaptive type digital data demodulating device of the fifth embodiment which is illustrated in FIG. 5. The timing flow of the replica table update is the same as that in the fifth embodiment.

Figure 16:
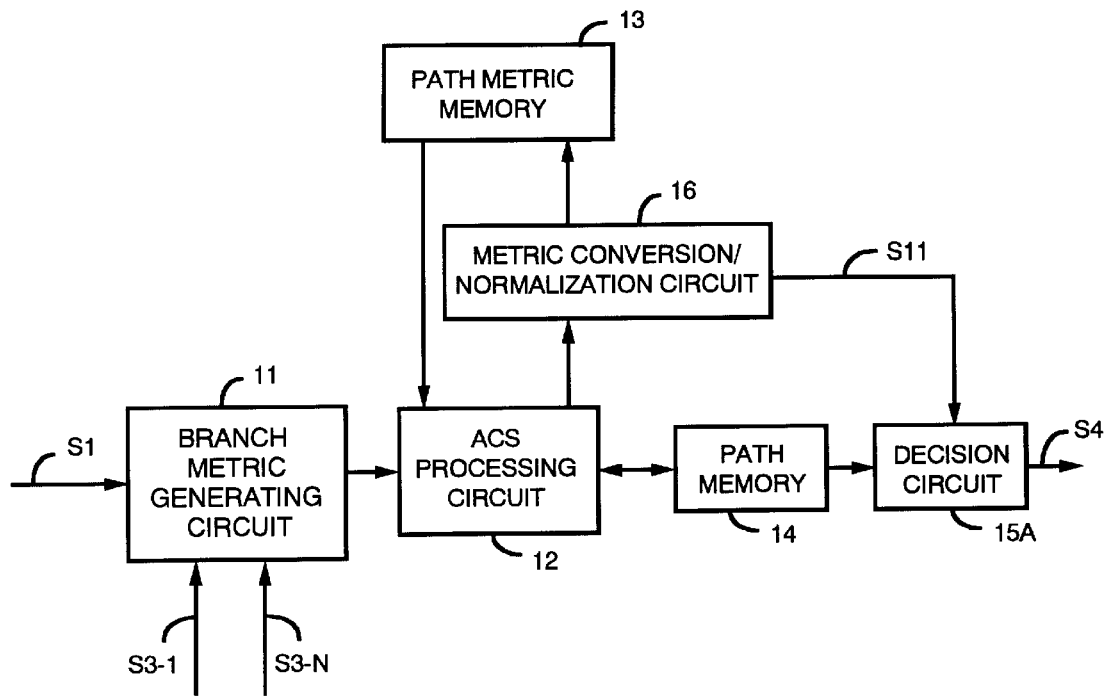
FIG. 16 illustrates a viterbi processor located in the adaptive digital data demodulating device according to the seventh embodiment of the present invention.

FIG. 16 shows the viterbi processor according to the seventh embodiment of the present invention. The viterbi processor of FIG. 16 is different from that of FIG. 6, explained for the second or the fifth embodiment, in the metric conversion/normalization circuit 16, data enable S11, and decision circuit 15A. In FIG. 16, same or equivalent portions in FIGS. 1–15 are represented with same numbers, and repeated explanations of them are omitted. In FIG. 16, the metric conversion/normalization circuit 16 converts the surviving path metric after updating which corresponds to the respective state output from the ACS processing circuit 12 under a particular rule, normalizes the surviving path metric based on this converted result, outputs the normalized path metric to the path memory 13, and outputs the data enable S11 to a decision circuit 15A. The decision circuit 15A decides the transmission data based on the surviving paths corresponding to the respective states output from the path memory 14, and on the data enable S11, and outputs the decision data S4.

Figure 17:
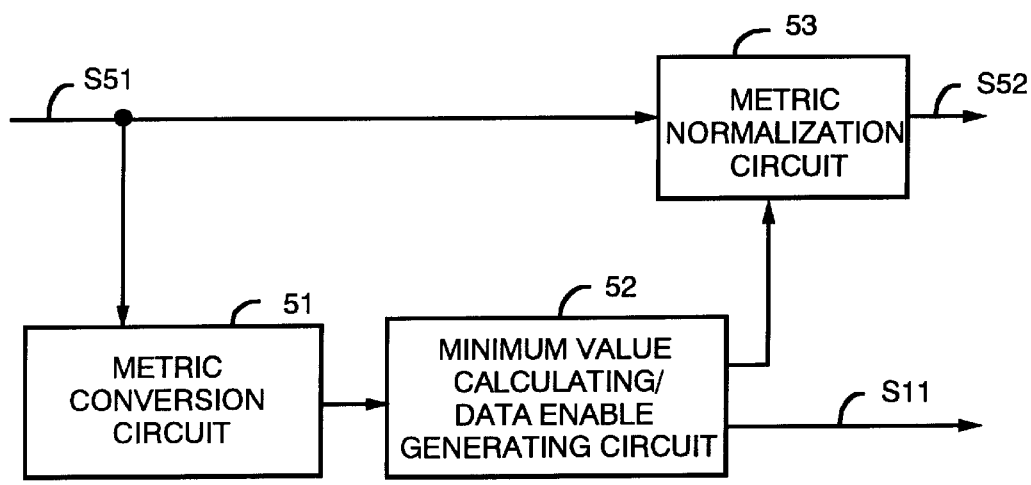
FIG. 17 illustrates a metric conversion/normalization circuit located in the adaptive digital data demodulating device according to the seventh embodiment of the present invention.

FIG. 17 shows an example of the metric conversion/normalization circuit 16. In FIG. 17, surviving path metric S51 corresponds to the respective state which is output from the ACS processing circuit 12. The metric conversion circuit 51 converts the surviving path metric S51, which correspond to the respective state, under a particular rule, and outputs the converted path metric which corresponds to the respective states. The minimum value calculating/data enable generating circuit 52 calculates the minimum value of the converted path metric, which corresponds to the respective state and is output from the metric conversion circuit 51, outputs the obtained minimum value to the normalization circuit 53, and outputs the data enable S11 corresponding to the respective state based on this obtained minimum value.

The metric normalization circuit 53 normalizes the surviving path metric S51, which corresponds to the respective state, using the minimum value of the converted path metric output from the minimum value calculating/data enable generating circuit 52, outputs the normalized path metric S52 corresponding to respective state. The normalized path metric S52 corresponding to the respective state is stored in the path metric memory 13 as surviving path metric corresponding to the respective state.

FIGS. 16 and 17 explain a process performed by the metric conversion/normalization circuit 16. The surviving path metric S51, which corresponds to the respective state, is indicated as $A^{(m)}$ (m=1, . . . , $N_S$). The metric conversion circuit 51 converts $A^{(m)}$ according to a formula (19), and outputs the converted path metric $B^{(m)}$, which corresponds to the respective state.

$$b_j^{(m)} = \sum_{l=j+1}^{L-1} a_l^{(m)} + \prod_{l=0}^{j} a_l^{(m)} \quad (19)$$

$$(j = 0, 1, \ldots, J-1)$$

In formula (19), $A^{(m)}$ has L bits, and respective bits are indicated as $a_l^{(m)}$ (l=0, 1, . . . , L−1; l=0 is LSB). In addition, $B^{(m)}$ has J bits, and respective bits are indicted as $b_j^{(m)}$ (j=0, 1, . . . , J−1; j=0 is LSB). Σ (Sigma) and + represent logic sum operation, and Π (pi) represents the logic product operation. The minimum value calculating/data enable generating circuit 52 calculates the minimum C of the converted path metric $B^{(m)}$, which corresponds to the respective state, according to a formula (20), and outputs the minimum C to the metric normalization circuit 53.

$$c_j = \prod_{m=1}^{N_s} b_j^{(m)} \quad (20)$$

In formula (20), the respective bits comprising C are represented as $c_j$ (j=0, 1, . . . , J−1; j=0 is LSB). The minimum value calculating/data enable generating circuit 52 calculates and outputs the data enable S11, corresponding to the respective state according to formula (21), in which the data enable S11 is represented as $DE^{(m)}$.

$$DE^{(m)} = \begin{cases} 0 & (B^{(m)} \neq C) \\ 1 & (B^{(m)} \neq C) \end{cases} \quad (21)$$

The metric normalization circuit 53 normalizes the surviving path metric $A^{(m)}$ S51 corresponding to the respective state, by the minimum C of the converted path metric corresponding to the respective state, in formula (22), and outputs path metric $D^{(m)}$ S52 corresponding to the respective state.

$$D^{(m)} = A^{(m)} - C \quad (22)$$

The decision circuit 15A decides the oldest transmission data candidate of the surviving paths corresponding to an arbitrary state in which the data enable $DE^{(m)}$ becomes 1 among the surviving paths corresponding to the respective states stored in the path memory 14, as transmission data, and determines it as decision data S4.

In the digital data demodulating device according to the seventh embodiment of the present invention, the metric conversion/normalization circuit located inside the viterbi processor converts the surviving path metric, which has been updated in the ACS processing circuit, only by using a simple logic operation, outputs the data enable indicating the state, in which this converted path metric becomes the smallest (this state is referred to as a quasi maximum likelihood state), to the decision circuit The decision circuit outputs the decision data from the surviving path corresponding to the quasi maximum likelihood state. In this manner, it is possible to shorten the path memory length U, to reduce circuit scale of the viterbi processor, and to minimize the decision delay in the viterbi processor in comparison to the fifth or the sixth embodiment of the present invention. Accordingly, in the CIR estimating circuit, it can easily follow the time variation of the channel, and the characteristics such as bit error rates can be also improved. Moreover, since the processing delay in the metric conversion/normalization circuit is small and does not depend on the number of the states in the digital data demodulating device, a digital data demodulating device with a large number of states can be applied to a high-speed-operating circuit.

In the digital data demodulating device according to the seventh embodiment, the CIR estimating circuit 4A, which is shown in FIG. 15, may be substituted for the CIR estimating circuit 4, in the same manner as that in the sixth embodiment.

In addition, in the same manner as that in the fifth embodiment of the present invention, the method using a known data sequence may be accompanied with the process performed by the CIR estimating circuit for the estimation of the CIR. Although the CIR estimating circuit of the seventh embodiment uses an LMS algorithm, other adaptive algorithms such as an RLS algorithm may be also used.

In the above explanation, it is assumed that the transmission data is modulated using BPSK, however, the device according to the seventh embodiment can be easily applied to the transmission data modulated in digital modulation methods other than BPSK.

In the above explanation, it is assumed that the estimated CIR is equally divided to N blocks. However, in the case that V/N does not result in an integer, the division does not have to be equal, and the device of the seventh embodiment can also be applied easily in such case. Also, the estimated CIR does not have to be divided (when N=1).

Moreover, the replica generating circuit includes a counter in the above explanation. However, a replica generating circuit without a counter may be used in the same manner as that in the first or the second embodiment.

In addition, the device according to the seventh embodiment can also be applied to DFSE type digital data demodulating device used in the fourth embodiment of the present invention.

Embodiment 8.

A digital data demodulating device according to the eighth embodiment uses formula (23) instead of formula (3) to calculate the branch metric En (k) in the branch metric generating circuit located inside the viterbi processor 1 of the first embodiment, which is illustrated in FIG. 1. In formula (23), Re indicates a real portion, and Im indicates an imaginary portion.

$$E_n(k) = |Re(r_n) - Re(R_n(k))| + |Im(r_n) - Im(R_n(k))| (k=1, 2, \ldots, 2^V) \quad (23)$$

In another method, the branch metric En (k) may be calculated by the branch metric generating circuit in the viterbi processor 1A of the second and third embodiments, illustrated in FIG. 4, or in the viterbi processor 1A according to the fifth and seventh embodiments, illustrated in FIG. 11, or in the viterbi processor 1A according to the sixth embodiment, illustrated in FIG. 14. In these cases, a formula (24) is used instead of formula (6). In formula (24), Re indicates real portion, and Im indicates imaginary portion.

$$E_n(k) = \left|Re(r_n) - \sum_{b=1}^{N} Re(R_n(b, k'))\right| + \left|Im(r_n) - \sum_{b=1}^{N} Im(R_n(b, k'))\right| \quad (24)$$

$$(k = 1, 2, \ldots, 2^v; k' = 1, 2, \ldots, 2^W)$$

generating circuit in the viterbi processor 1B according to the fourth embodiment, illustrated in FIG. 8, and in this case, formula (25) is used instead of formula (9). In formula (25), Re indicates the real portion, and Im indicates the imaginary portion.

$$E_n(k) = \left|Re(r_n) - \sum_{b=1}^{N} Re(RS_n(b, k))\right| + \left|Im(r_n) - \sum_{b=1}^{N} Im(RS_n(b, k))\right| \quad (25)$$

$$(k = 1, 2, \ldots, 2^{v'})$$

The digital data demodulating device according to the eighth embodiment uses an absolute calculation instead of the square calculation upon calculating the branch metric, therefore the circuit scale is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital data demodulating device for estimating channel impulse response (CIR) based on a received signal, deciding transmission data by performing a viterbi algorithm using a replica generated in response to an estimated CIR and the received signal, and outputting decision data, said digital data demodulating device comprising:
   a CIR register storing the estimated CIR;
   a replica calculator reading the estimated CIR stored in said CIR register, and calculating the replica using the estimated CIR;
   a replica table calculator; and
   a counter sequentially counting and outputting counter data including vectors of a bit number corresponding to a number of states, wherein said replica calculator reads the estimated CIR stored in said CIR register, and calculates the replica using the estimated CIR and the counter data output from said counter.

2. The digital data demodulating device of claim 1, further comprising:
   a selector selecting the replica stored in said replica table in response to a surviving path, when a viterbi algorithm is performed by generating the replica using the surviving path connected to a preceding state, and for outputting the replica according to a trellis diagram.

3. The digital data demodulating device of claim 1, further comprising:
   a delay delaying the received signal by a period from an input of the received signal to an output of the decision data; and a CIR estimator estimating CIR sequentially based on the received signal output from said delay and the decision data, wherein the replica of said replica table is updated by reading the estimated CIR output from said CIR estimator at a predetermined timing.

4. The digital data demodulating device of claim 3, wherein said CIR estimator estimates the CIR sequentially based on the received signal output from said delay, the decision data, and the replica stored in said replica table.

5. A digital data demodulating device for estimating channel impulse response (CIR) based on a received signal, deciding transmission data by performing a viterbi algorithm using a replica generated in response to an estimated CIR and the received signal, and outputting the decision data, said digital demodulating device comprising:

a plurality of divided CIR registers dividing the estimated CIR into a predetermined number of blocks and storing the divided estimated CIR;

a plurality of divided replica calculators reading the divided estimated CIR stored in said a Plurality of divided CIR registers, and calculating divided replicas using corresponding estimated CIR; and a plurality of replica tables provided corresponding to said a plurality of divided replica calculators storing the divided replicas output from said a plurality of divided replica calculators.

6. The digital data demodulating device of claim 5, further comprising:

a counter sequentially counting counter data including a bit number corresponding to a divided block number and a state number, wherein said plurality of divided replica calculators read out the divided estimated CIR stored in the corresponding plurality of divided CIR registers, and for calculating the divided replicas using the corresponding divided estimated CIR and the counter data output from said counter.

7. The digital data demodulating device of claim 6, further comprising:

a plurality of divided selectors provided corresponding to said plurality of replica tables selecting a divided replica stored in said plurality of divided replica tables in response to a surviving path, when a viterbi algorithm is performed by generating the replica using the surviving path connected to a preceding state, and for outputting the replica according to a trellis diagram.

8. The digital data demodulating device of claim 5, further comprising:

a delay delaying the received signal by a period from an input of the received signal to an output of the decision data; and a CIR estimator estimating CIR sequentially based on the received signal output from said delay and the decision data, wherein the divided replicas in said plurality of divided replica tables are updated by reading the estimated CIR output from said CIR estimator at a predetermined timing.

9. The digital data demodulating device of claim 8, wherein said CIR estimator estimates the CIR sequentially based on the received signal output from said delay and the decision data and the decided replicas stored in said plurality of replica tables.

10. The digital data demodulating device of claim 5, wherein a surviving path metric corresponding to a respective state is converted according to a predetermined rule, and the transmission data is decided using a surviving path corresponding to a quasi maximum likelihood state in which a corresponding converted path metric is smallest.

11. The digital data demodulating device of claim 5, wherein an absolute value calculation is used to calculate a branch metric.

12. An apparatus, comprising:

a digital data demodulator for estimating channel impulse response (CIR) based on a received signal, deciding transmission data by performing a viterbi algorithm using a replica generated in response to said estimated CIR and said received signal, and outputting decision data, wherein a surviving path metric corresponding to a respective state is converted according to a predetermined rule, and said transmission data is decided using said surviving path corresponding to a quasi maximum likelihood state in which a corresponding converted path metric is smallest.

* * * * *